US010088958B2

(12) United States Patent
Park et al.

(10) Patent No.: US 10,088,958 B2
(45) Date of Patent: Oct. 2, 2018

(54) DISPLAY APPARATUS AND INPUT METHOD OF DISPLAY APPARATUS

(71) Applicant: SAMSUNG ELECTRONICS CO., LTD., Suwon-si (KR)

(72) Inventors: Han Jin Park, Suwon-si (KR); Tae Soon Park, Hwaseong-si (KR); Sun Rock Lee, Cheonan-si (KR); Yong Min Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/050,551

(22) Filed: Feb. 23, 2016

(65) Prior Publication Data

US 2017/0060346 A1 Mar. 2, 2017

(30) Foreign Application Priority Data

Aug. 27, 2015 (KR) .................. 10-2015-0121266

(51) Int. Cl.
*G09G 5/00* (2006.01)
*G06F 3/042* (2006.01)
(Continued)

(52) U.S. Cl.
CPC .......... *G06F 3/0425* (2013.01); *G06F 3/0412* (2013.01); *G06F 3/0414* (2013.01); *G06F 1/1601* (2013.01); *G06F 2203/04105* (2013.01)

(58) Field of Classification Search
CPC ...... G06F 3/011; G06F 3/0425; G06F 3/0412; G06F 3/0416; G06F 3/038; G06F 3/0383;
(Continued)

(56) References Cited

U.S. PATENT DOCUMENTS

2004/0183787 A1 9/2004 Geaghan et al.
2009/0295753 A1 12/2009 King et al.
(Continued)

FOREIGN PATENT DOCUMENTS

EP 2413221 A1 2/2012
EP 2816393 A1 12/2014
WO 2014/005218 A1 1/2014

OTHER PUBLICATIONS

International Search Report (PCT/ISA/210), issued by International Searching Authority in counterpart International Application No. PCT/KR2016/001548, dated Jun. 17, 2016.
(Continued)

*Primary Examiner* — Jennifer Nguyen
(74) *Attorney, Agent, or Firm* — Sughrue Mion, PLLC

(57) ABSTRACT

A display apparatus and an input method of the display apparatus are provided. The display apparatus includes a bottom chassis, and a display panel disposed above the bottom chassis, the display panel including an active area configured to display a control menu, and a black mask area surrounding the active area. The display apparatus further includes a light source configured to irradiate light, an optical member configured to cause the irradiated light to be incident on the display panel, and a middle frame disposed on the optical member and configured to support the display panel. The display apparatus further includes a sensor disposed between the middle frame and the display panel, and configured to sense a user input.

14 Claims, 21 Drawing Sheets

(51) Int. Cl.
*G06F 3/041* (2006.01)
*G06F 1/16* (2006.01)

(58) Field of Classification Search
CPC ..... G06F 2203/041; G06F 2203/04105; G06F 2203/04808; G06F 3/017; G06F 3/0488; G06F 3/04883
USPC .......................... 345/156, 157, 173; 715/863
See application file for complete search history.

(56) References Cited

U.S. PATENT DOCUMENTS

| | | | | |
|---|---|---|---|---|
| 2010/0026656 | A1* | 2/2010 | Hotelling | G06F 3/044 345/174 |
| 2010/0309102 | A1 | 12/2010 | Jung | |
| 2011/0227847 | A1* | 9/2011 | Yoshiyama | G06F 3/041 345/173 |
| 2011/0242465 | A1* | 10/2011 | Lee | G02F 1/133308 349/110 |
| 2012/0001942 | A1* | 1/2012 | Abe | G09G 5/003 345/650 |
| 2012/0032907 | A1* | 2/2012 | Koizumi | G06F 3/0414 345/173 |
| 2013/0127754 | A1* | 5/2013 | Kwon | G06F 3/0488 345/173 |
| 2014/0009413 | A1 | 1/2014 | Su et al. | |
| 2014/0176872 | A1* | 6/2014 | Miyazaki | G02B 6/0088 349/65 |
| 2014/0211122 | A1* | 7/2014 | Wurzel | G02F 1/133308 349/61 |
| 2015/0160494 | A1 | 6/2015 | Shin et al. | |
| 2015/0160849 | A1* | 6/2015 | Weiss | G06F 3/044 345/174 |

OTHER PUBLICATIONS

Communication dated Jan. 25, 2017, issued by the European Patent Office in counterpart European Application No. 16167409.8.
Communication dated May 3, 2017, from the European Patent Office in counterpart European Application No. 16167409.8.

* cited by examiner

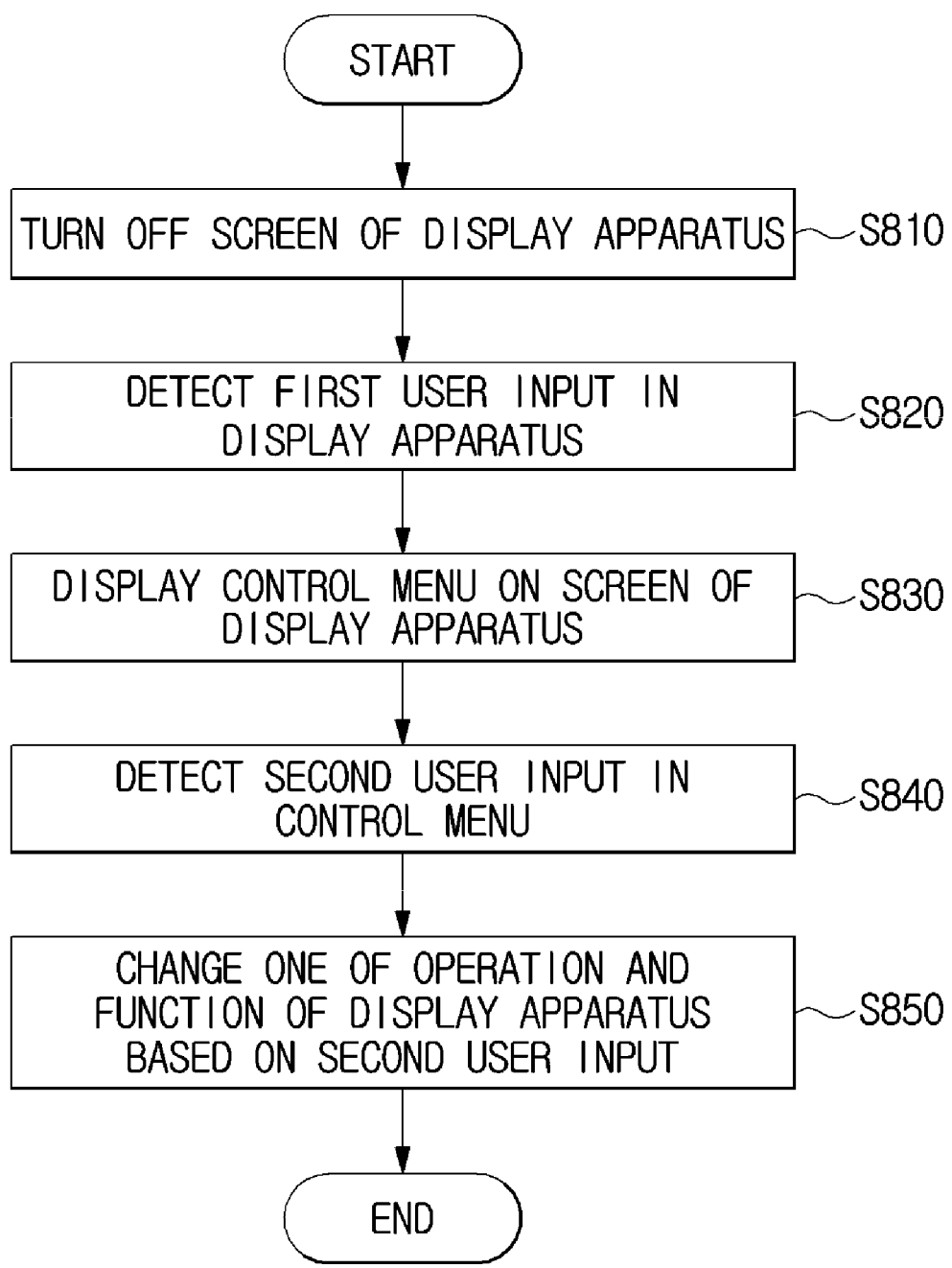

DISPLAY APPARATUS AND INPUT METHOD OF DISPLAY APPARATUS

CROSS-REFERENCE TO RELATED APPLICATION

This application claims priority from Korean Patent Application No. 10-2015-0121266, filed on Aug. 27, 2015 in the Korean Intellectual Property Office, the disclosure of which is incorporated herein by reference in its entirety.

BACKGROUND

1. Field

Apparatuses and methods consistent with exemplary embodiments relate to a display apparatus and an input method thereof, and more particularly, to an input method through a screen of the display apparatus.

2. Description of the Related Art

In recent years, a high-resolution and a large-sizing of a screen that displays content in a display apparatus have been realized. The display apparatus has become thinner and lighter.

As an interface for controlling the display apparatus between the display apparatus and a user, a remote control device or a panel key of the display apparatus are generally used. As the width of a bezel of the display apparatus is smaller and the thickness of the display apparatus is smaller, it may be difficult for a user to find and operate a panel key positioned on a rear surface or a side surface of the display apparatus.

SUMMARY

Exemplary embodiments may address at least the above problems and/or disadvantages and other disadvantages not described above. Also, the exemplary embodiments are not required to overcome the disadvantages described above, and may not overcome any of the problems described above.

One or more exemplary embodiments provide a display apparatus and an input method through a screen of the display apparatus.

According to an aspect of an exemplary embodiment, there is provided a display apparatus including a bottom chassis, and a display panel disposed above the bottom chassis, the display panel including an active area configured to display a control menu, and a black mask area surrounding the active area. The display apparatus further includes a light source configured to irradiate light, an optical member configured to cause the light irradiated from the light source to be incident on the display panel, a middle frame disposed on the optical member, and configured to support the display panel, and a sensor disposed between the middle frame and the display panel, and configured to sense a user input.

The sensor may be further configured to sense a force or a pressure of the user input.

The sensor may include one of a sensing area and a pressing area configured to sense a force or a pressure of the user input.

The one of the sensing area and the pressing area may be disposed below the black mask area.

The one of the sensing area and the pressing area may contact the black mask area.

The display apparatus may further include a top chassis that is coupled to the bottom chassis, the top chassis including a bezel. The one of the sensing area and the pressing area may be disposed below the bezel.

The one of the sensing area and the pressing area may be disposed in the black mask area, and a straight line may extend in a direction of the one of the sensing area and the pressing area from a center of a symbol of the control menu and pass through the one of the sensing area and the pressing area.

The sensor may include a plurality of sensors disposed in the black mask area to be spaced apart from each other.

According to an aspect of another exemplary embodiment, there is provided a display apparatus including a bottom chassis, a light source configured to irradiate light, and a display panel configured to display content through the irradiated light, the display panel including an active area configured to display a control menu, and a black mask area surrounding the active area. The display apparatus further includes an optical member configured to cause the irradiated light to be incident on the display panel, a sensor disposed on the display panel, and configured to sense a user input, and a top chassis coupled to the bottom chassis.

The sensor may be further configured to detect a force or a pressure of the user input.

The sensor may include one of a sensing area and a pressing area configured to detect a force or a pressure of the user input.

The one of the sensing area and the pressing area may be disposed on the black mask area.

The one of the sensing area and the pressing area may contact the black mask area.

The top chassis may include a bezel, and the one of the sensing area and the pressing area may be disposed below the bezel.

The one of the sensing area and the pressing area may be disposed on the black mask area, and a straight line may extend in a direction of the one of the sensing area and the pressing area from a center of a symbol of the control menu and pass through the one of the sensing area and the pressing area.

The sensor may include a plurality of sensors disposed on the black mask area to be spaced apart from each other.

According to an aspect of another exemplary embodiment, there is provided an input method of a display apparatus including detecting a first user input, displaying a control menu in response to the detecting the first user input, detecting a second user input through the control menu, and changing a function or an operation of the display apparatus in response to the detecting the second user input.

The detecting the first user input and the detecting the second user input may be performed by at least one of a camera and a sensor disposed in a black mask area of the display apparatus.

The detecting the first user input may be performed by the camera or the sensor.

The detecting the second user input may be performed by the sensor.

BRIEF DESCRIPTION OF THE DRAWINGS

The above and/or other aspects will be more apparent by describing exemplary embodiments with reference to the accompanying drawings, in which:

FIG. 8 is a schematic flowchart showing an input method of a display apparatus according to an exemplary embodiment.

DETAILED DESCRIPTION

Figure 1A:
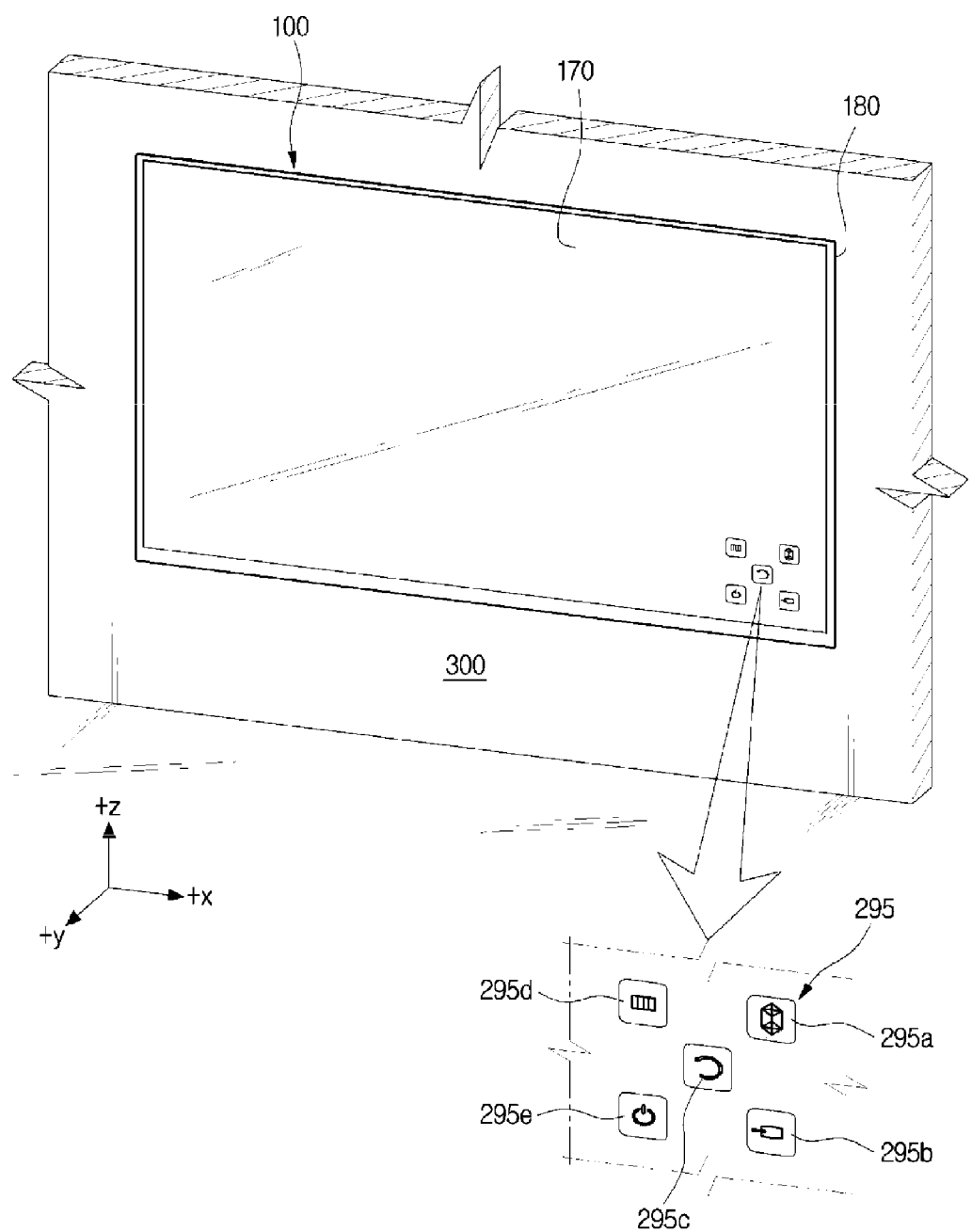
FIGS. 1A, 1B, and 1C are schematic front perspective views showing a display apparatus fixed to a wall according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions may not be described in detail because they would obscure the description with unnecessary detail.

It will be understood that the terms "comprises" and/or "comprising" used herein specify the presence of stated features or components, but do not preclude the presence or addition of one or more other features or components. In addition, the terms such as "unit," "-er (-or)," and "module" described in the specification refer to an element for performing at least one function or operation, and may be implemented in hardware, software, or the combination of hardware and software.

Content may be displayed in a display apparatus. For example, the content may include video files or audio files reproduced in a video player that is one among applications, music files reproduced in a music player, photo files displayed in a photo gallery, web page files displayed in a web browser, and the like. In addition, the content may include received broadcasting.

Figure 1B:
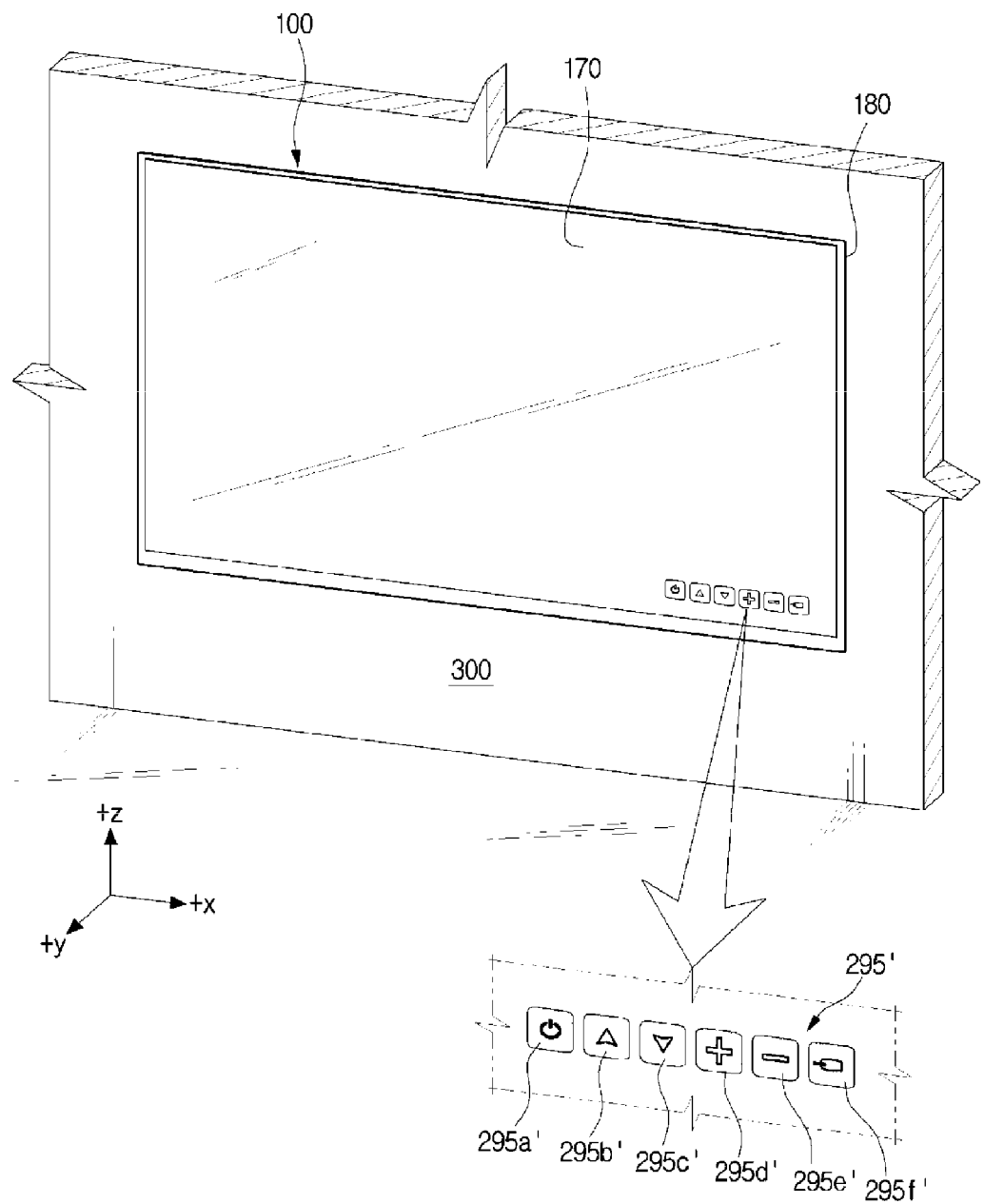
Figure 1C:
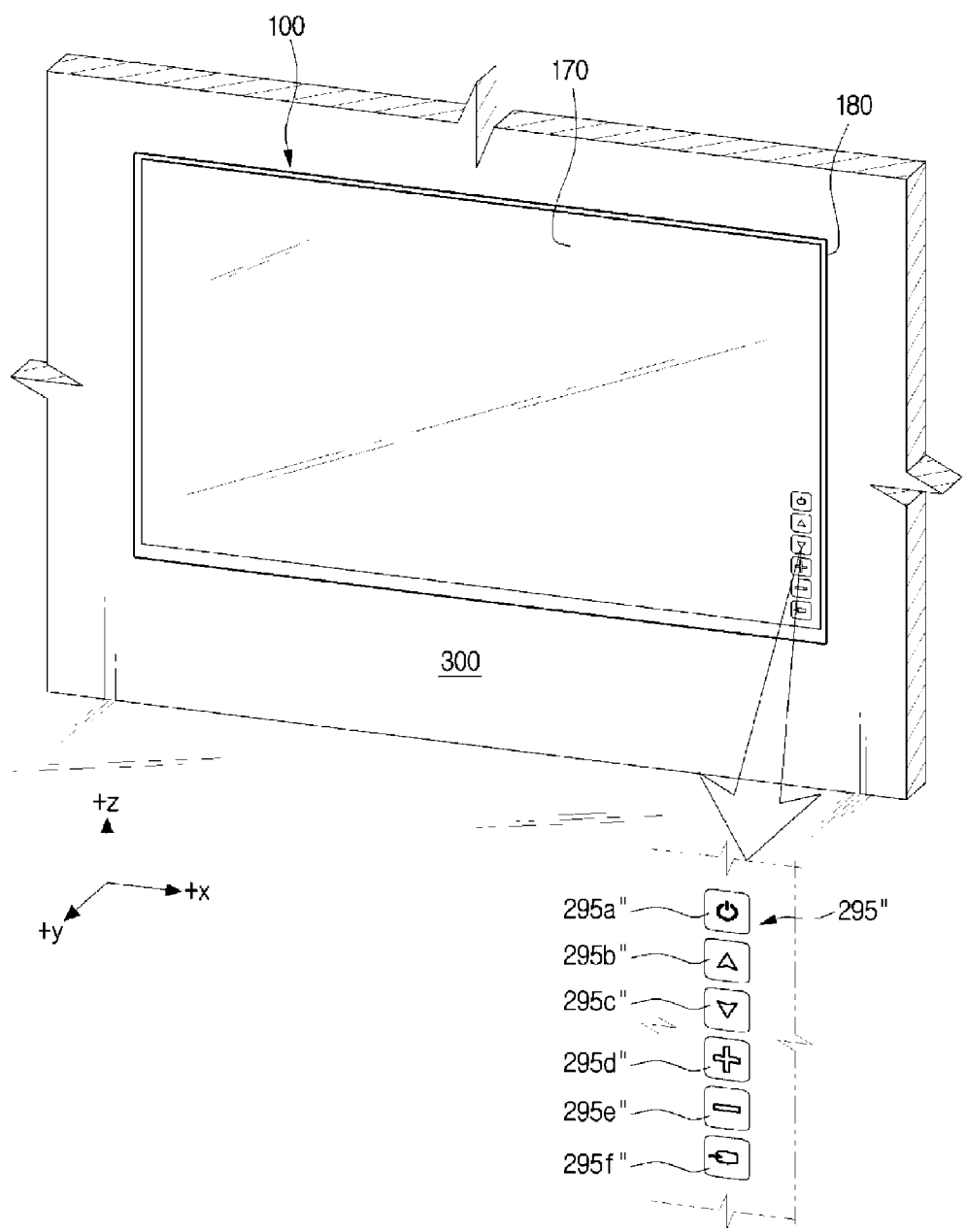

FIGS. 1A, 1B, and 1C are schematic front perspective views showing a display apparatus fixed to a wall according to an exemplary embodiment.

Referring to FIGS. 1A to 1C, a display apparatus 100 is fixed to a wall 300 by a wall mount. In addition, the display apparatus 100 may be supported by a stand.

The display apparatus 100 includes a display panel 170 that displays content and a bottom chassis 110 (shown in FIGS. 2A to 2D) and a top chassis 180 that support the display panel 170. In addition, the display apparatus 100 may include a variety of components (for example, a plurality of light sources 120, a reflecting sheet 130, a diffusion plate 145, and a middle holder 140, as shown in FIGS. 2A to 2D) as well as the above-described components.

In the display apparatus 100, a control menu 295 is displayed through the display panel 170. Symbols (for example, including icons, images, or texts) of the control menu 295 displayed on one side of the display panel 170 may include a smart hub 295a that is associated with the function and/or control of the display apparatus 100, an external input (source) 295b, a return 295c, a menu 295d and/or a power on/off 295e. In addition, symbols displayed in control menus 295' and 295" may include power on/offs 295a' and 295a", channel changes 295b', 295c', 295b", and 295c", volume changes 295d', 295e', 295d", and 295e", and/or external inputs 295f' and 295f", respectively.

According to an exemplary embodiment, the control menu 295 may refer to including the control menu 295' or the control menu 295".

The number of the symbols displayed in the control menus 295, 295', and 295" may be one or ten or less to correspond to the function and/or control of the display apparatus. The above-described five symbols are an example, and the symbols are not limited thereto.

The array of the control menu 295 may include an "X"-shaped array, a "+"-shaped array, a "–"-shaped array, a "□"-shaped array, a "◇"-shaped array, a "○"-shaped array, an "M×N" array (in which M and N are natural numbers), or a "|"-shaped array. To correspond to the array of the control menu 295, a sensor 165 (shown in FIGS. 2A to 2D) may be positioned between the bottom chassis 110 and the top chassis 180. When the control menu 295 displayed in the display panel 170 receives a user input (for example, tap), the sensor 165 of the display apparatus 100 may detect a pressure (or force) corresponding to the user input. The display apparatus 100 may detect the user input using the sensor 165.

In the display apparatus 100, a camera 245 (shown in FIG. 7) may be exposed to the outside. The display apparatus 100 may detect the user's appearance through the camera 245.

Sizes and/or shapes of components included in the display apparatus 100 can be changed in response to the reduction in the thickness of the display apparatus 100.

The display apparatus 100 is one among output apparatuses for visually and/or acoustically outputting content, and the display apparatus 100 having a liquid crystal display (LCD) panel, a light emitting diode (LED) panel, an organic light emitting diode (OLED) panel, or the like may be installed on the wall 300 using the wall mount due to its thin thickness.

The display apparatus 100 may include an analog TV, a digital TV, a 3D-TV, a smart TV, an LED TV, an OLED TV, a plasma TV, a quantum dot TV, and/or a monitor. In addition, the display apparatus 100 may include a mobile phone having a display, a smart phone, an MP3 player, a video player, a tablet PC, an electronic board, a digital signage, and/or a wearable device that can be worn in the human body.

The display apparatus 100 may be implemented as a curved display apparatus having a screen with a fixed curvature, a flexible display apparatus having a screen with a fixed curvature, a bended display apparatus having a screen with a fixed curvature, and/or a curvature-variable display apparatus in which a curvature of a current screen can be changed by a received user input as well as a flat display apparatus, but is not limited thereto.

On a rear surface (for example, the surface of the bottom chassis 110 capable of being coupled to the wall mount) of the display apparatus 100, four video electronics standards association (VESA) holes or more (or VESA mount hole) may be formed according to the VESA standard. The VESA holes may be formed in a polygonal shape or a "T"-shape on the rear surface of the display apparatus 100.

The wall mount may be coupled to the VESA holes by a fastening member (for example, screws, rivets, or the like) to be fixed to the display apparatus 100.

On the rear surface of the display apparatus 100, four VESA holes or more may be formed according to a non-VESA standard. The VESA holes according to the non-VESA standard may be formed in a polygonal shape or a "T"-shape on the rear surface of the display apparatus 100.

FIGS. 2A, 2B, 2C, and 2D are schematic exploded perspective views showing a display apparatus according to an exemplary embodiment.

Referring to FIGS. 2A to 2D, the display apparatus 100 includes the bottom chassis 110, a light source printed circuit board 115, the light sources 120, the reflecting sheet 130, a light guide plate 135, the middle holder 140, the diffusion plate 145, an optical sheet 150, a middle frame 160, the sensor 165, the display panel 170, and the top chassis 180.

The light sources 120, the reflecting sheet 130, the light guide plate 135, the diffusion plate 145, and the optical sheet 150 may be referred to as a backlight. The light source printed circuit board 115, the light sources 120, the reflecting sheet 130, the light guide plate 135, the diffusion plate 145, and the optical sheet 150 may be referred to as a backlight. In addition, components except the bottom chassis 110, the middle holder 140, the middle frame 160, the display panel 170, and the top chassis 180 may be referred to as a backlight.

The bottom chassis 110 may support the light source printed circuit board 115 on a rear side of the light source printed circuit board 115 in which the light sources 120 are mounted. The bottom chassis 110 may accommodate other components (for example, the reflecting sheet 130, the light guide plate 135, the middle holder 140, the diffusion plate 145, the optical sheet 150, the middle frame 160, and the like), in addition to the light source printed circuit board.

The bottom chassis 110 may be formed in a polygonal plate with a high strength, and may be made of a metallic material (for example, aluminum, an aluminum alloy, and the like) with small thermal deformation that is caused by the heat generation of the accommodated light sources 120 and/or display panel 170. The metallic material may include light metals of which the specific gravity is 4 or less and include nonferrous metals except iron and an alloy whose main component is iron.

The bottom chassis 110 may be formed by a plastic (for example, PC (polycarbonate)) material or formed by adding glass fiber to a plastic material.

The light source printed circuit board 115 includes the light sources 120 mounted therein. The light source printed circuit board 115 may include a plurality of lenses that diffuses light emitted from the light sources 120, respectively. In addition, according to an exemplary embodiment, the light sources 120 may include the plurality of lenses, respectively.

The size of the light source printed circuit board 115 may correspond to the size of the display panel 170. In addition, the light source printed circuit board 115 may include the light sources 120 and a set (for example, constituted of a plurality of arrays) of light source bars including the plurality of lenses corresponding to the light sources 120.

The light source bars may be arranged in parallel to each other (for example, direct type) to be spaced apart from each other on a rear surface (for example, bottom) of the bottom chassis 110, or arranged (for example, edge type) on both side surfaces (for example, upper/lower side surfaces or left/right side surfaces) of the bottom chassis 110. The light source bars may be arranged on one side surface (for example, one among upper/lower side surfaces or one among left/right side surfaces) of the bottom chassis 110. In addition, the light source bars may be arranged on all of the side surfaces (for example, upper/lower/left/right side surfaces) of the bottom chassis 110.

The light source printed circuit board 115 is electrically connected to a power source supply that supplies power to the display apparatus 100. The sets of the light source bars may be electrically connected to each other.

The light sources 120 are mounted in the light source printed circuit board 115 to be supported by the bottom or the side surface of the bottom chassis 110. The light sources 120 may irradiate light by the supplied power. The light sources 120 may irradiate light to the display panel 170 positioned on the front side (for example, +y direction) and serve as a backlight in the display apparatus 100. Each of the light sources 120 may include an LED or a cold cathode fluorescent lamp (CCFL).

When the light source bars are positioned on at least one side surface of the bottom chassis 110, the light guide plate 135 may evenly guide the light irradiated from the light sources 120, to the display panel 170. The light guide plate 135 may be made of a transparent plastic material.

When the display panel 170 of the display apparatus 100 is an organic LED, there may be no light sources 120.

The reflecting sheet 130 makes the light irradiated from the light sources 120 incident in the direction of the light guide plate 135 or makes the light reflected from the light guide plate 135 incident on the light guide plate 135 again. The reflecting sheet 130 is disposed above the light sources 120 and/or the light source printed circuit board 115 to reflect leaked light in the direction of the display panel 170, thereby improving the light efficiency. The reflecting sheet 130 may be coated with a white or silver highly reflective coating agent (e.g., silver or TiO2).

The reflecting sheet 130 has a plurality of openings 131 corresponding to the protrusions of the light sources 120 accommodated in the bottom chassis 110. The light sources 120 that protrude to correspond to the openings 131 of the reflecting sheet 130 irradiate light in the direction of the light guide plate 135.

The number of the reflecting sheets 130 may be one or two or more. In addition, the reflecting sheet 130 may include a reflecting plate.

The light guide plate 135 may allow the light irradiated from the light sources 120 to be dispersed uniformly in the direction of the diffusion plate 145. The light guide plate 135 may be an acrylic material or polycarbonate material. Depending on the arrangement (e.g., direct type or edge type) of the light source bars, the light guide plate 135 may be excluded.

The middle holder 140 may support the diffusion plate 145 and/or the optical sheet 150 using a plurality of middle holder protrusions. The middle holder 140 may be accommodated in a plurality of corners (for example, four corners or three corners or less) of the bottom chassis 110. The light irradiated from the light sources 120 may be made incident on the diffusion plate 145 and/or the optical sheet 150 without the interference of the middle holder 140.

The middle holder 140 may support the reflecting sheet 130 extending from the light source printed circuit board 115.

The diffusion plate 145 may uniformly diffuse the light irradiated from the light sources 120 positioned below the diffusion plate 145. In addition, the diffusion plate 145 may support the optical sheet 150 positioned above the diffusion plate 145. The diffusion plate 145 evenly diffuses the light incident from the light sources 120, and emits the diffused light to the optical sheet 150. The diffusion plate 145 may be a transparent material or opaque material. The diffusion plate 145 may include an acrylic, urethane, epoxy, polyester, polyamide, polystyrene, or polycarbonate material.

The optical sheet 150 may allow the light that is irradiated from the light sources 120 and passes through the diffusion plate 145 to have a uniform luminance. The light having the uniform luminance that has passed through the optical sheet 150 may be made incident on the display panel 170.

The optical sheet 150 includes a plurality of sheets 151 to 153 overlapped by a middle holder protrusion. The optical sheets 151 to 153 may have an optical sheet protrusion corresponding to the middle holder protrusion. The optical sheet 150 may include a protective sheet, a prism sheet, or a diffuser sheet. The optical sheet 150 may include one or more sheets.

The reflecting sheet 130, the light guide plate 135, the diffusion plate 145, and/or the optical sheet 150 may be referred to as optical members. As the optical members, at least one among the reflecting sheet 130, the light guide plate 135, the diffusion plate 145, and the optical sheet 150 may be excluded.

The middle frame 160 is positioned below the display panel 170, and supports the display panel 170. In addition, the middle frame 160 may allow the display panel 170 positioned above the middle frame 160 to be spaced apart from the optical sheet 150 positioned below the middle frame 160.

The middle frame 160 includes a middle frame protrusion for supporting the optical sheet 150. In addition, the middle frame 160 may support the optical sheet 150 together with the middle frame protrusion and the middle holder protrusion of the middle holder 140.

The material of the middle frame 160 may include acrylonitrile-butadiene-styrene (ABS) resin and/or glass fiber. In addition, the material of the middle frame 160 may include a variety of plastic, resin, and/or metallic materials.

The sensor 165 may detect a user input received by the display panel 170. The sensor 165 may include a force sensor or a pressure sensor. The sensor 165 may be positioned on one side (for example, a black matrix area of the display panel 170) of the display panel 170. In addition, the sensor 165 may be positioned between the bottom chassis 110 and the top chassis 180. The position of the sensor 165 will be described in detail later.

The sensor 165 may include a film type or a chip type (e.g., hexahedron or cylinder). The thickness of the sensor 165 may be 1 mm or less. In addition, the thickness of the sensor 165 may be 0.03 mm or more and 1.2 mm or less. The width (or diameter) of a sensing area 165s may be shorter than the width of one among bezels 180a. According to an exemplary embodiment, the sensor 165 may be used as having the same meaning as a sensor 265 (shown in FIG. 7).

Figure 2A:
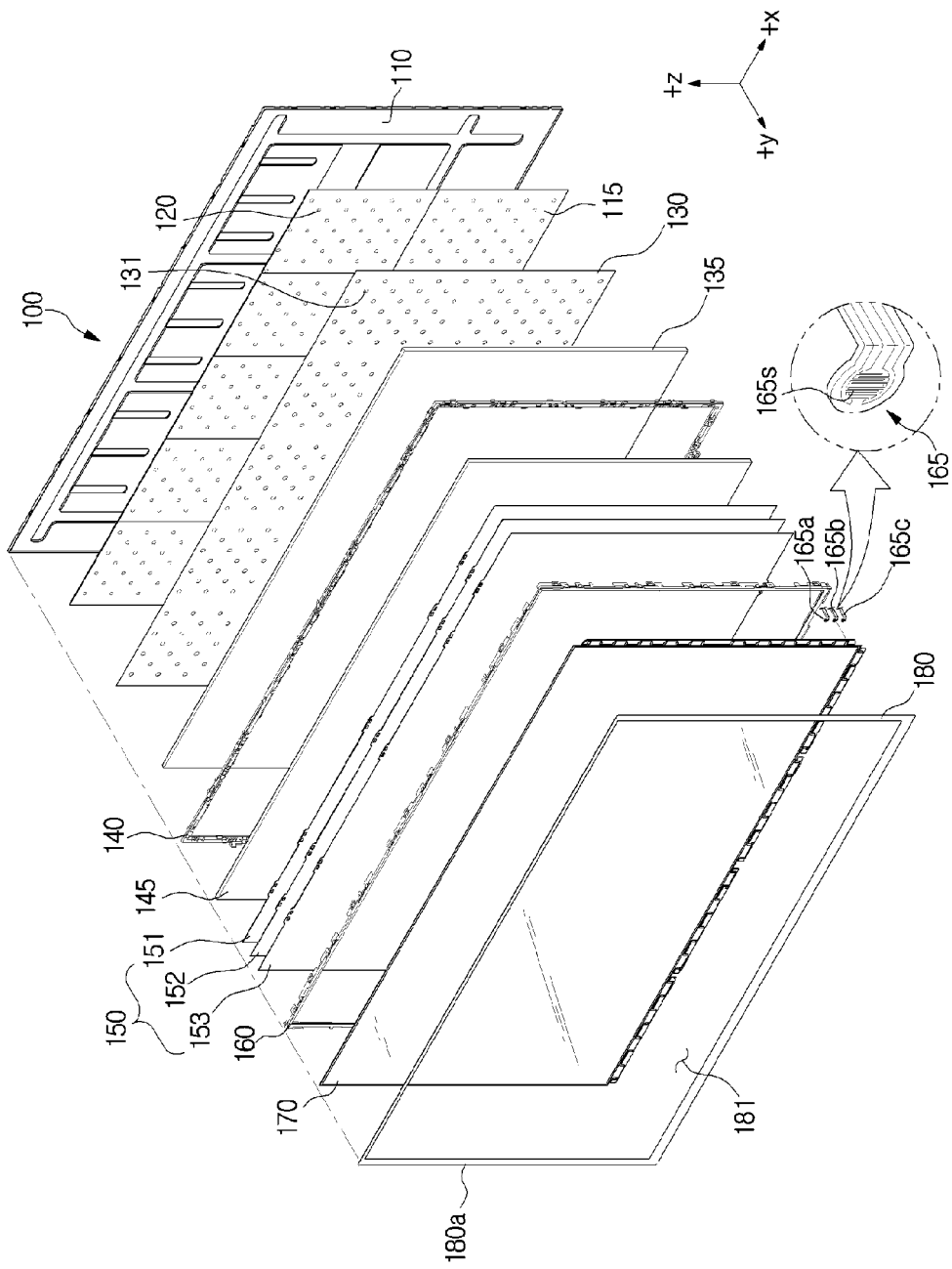
FIGS. 2A, 2B, 2C, and 2D are schematic exploded perspective views showing a display apparatus according to an exemplary embodiment.
Figure 2B:
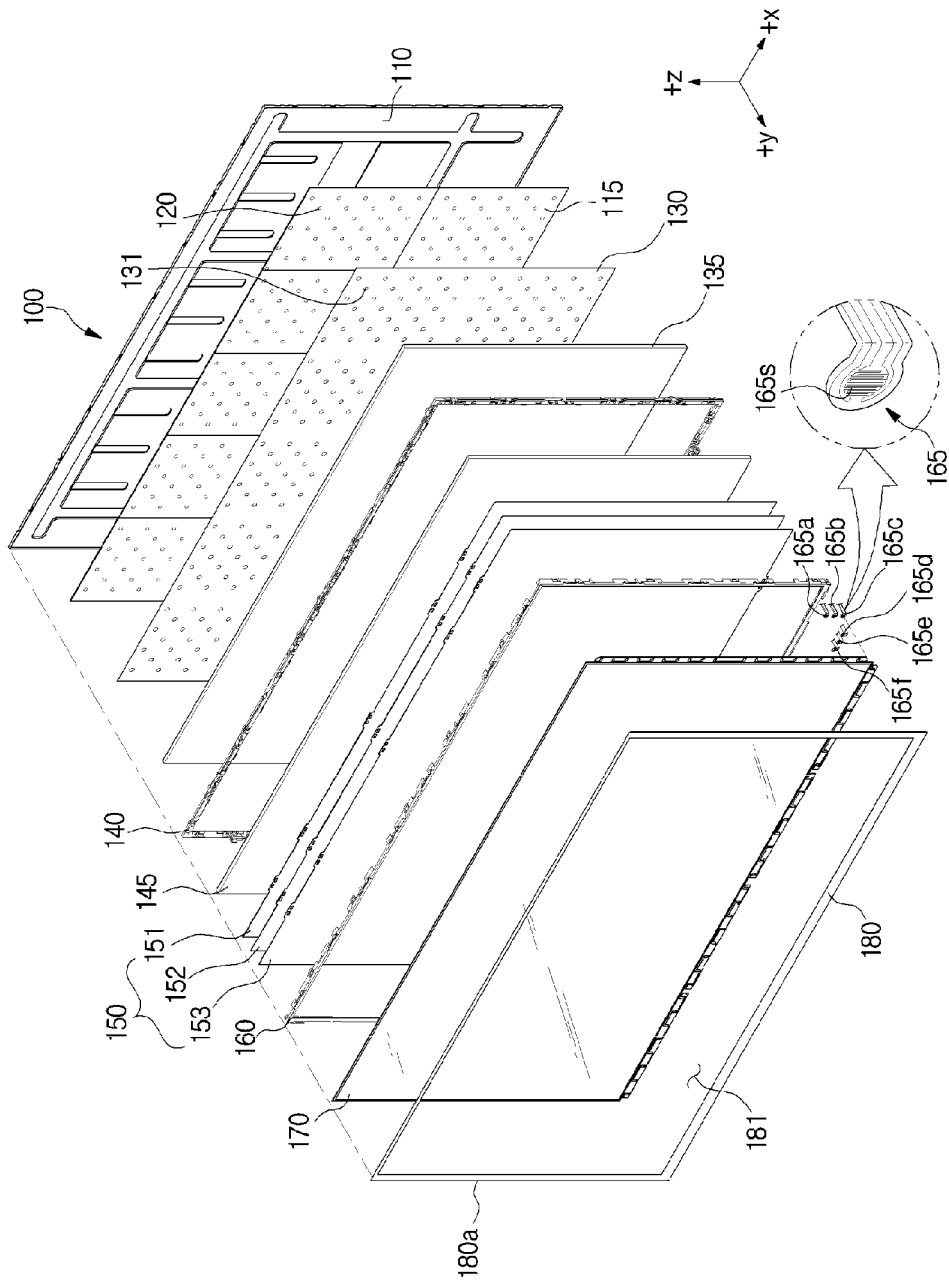
Figure 2C:
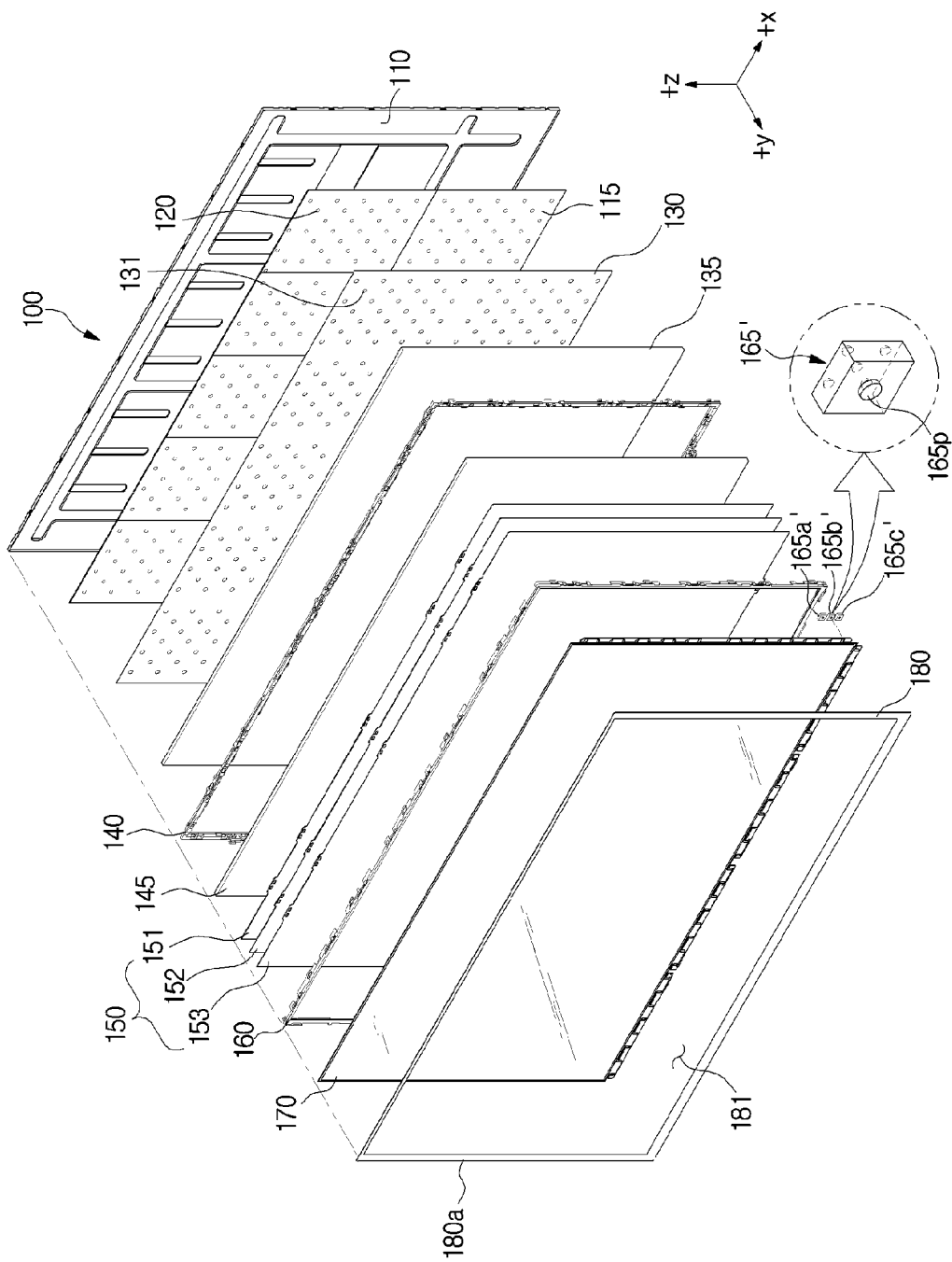
Figure 2D:
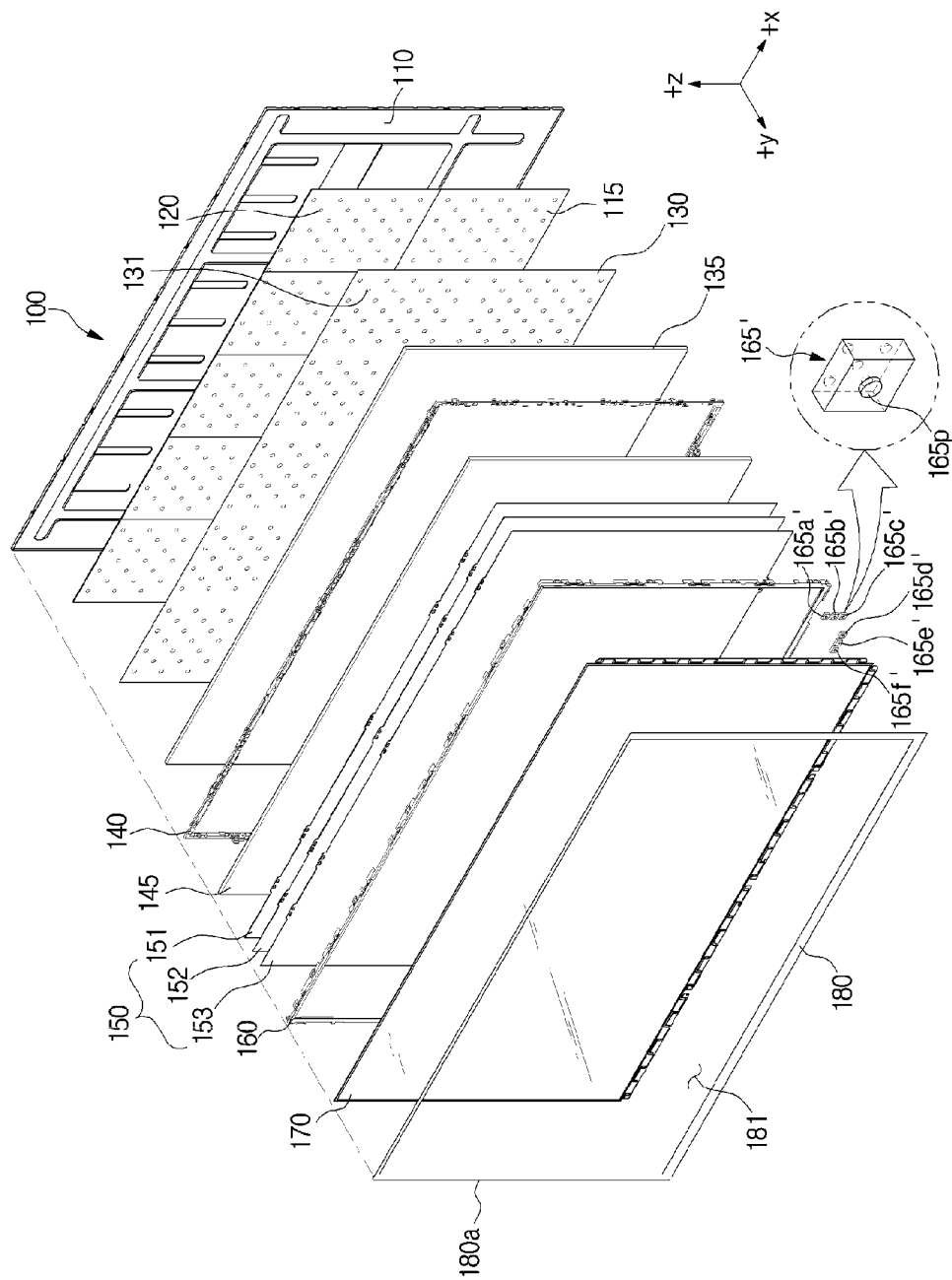

Referring to FIGS. 2A and 2B, the film type sensor 165 may include the sensing area 165s that detects a force (or pressure) input to the front surface. The force (or pressure) that can be detected in the sensing area 165s may be 10 mN (newton) to several tens of N. Referring to FIGS. 2C and 2D, a chip type sensor 165' may include a pressing area 165p in which the force (or pressure) is pressed. The force (or pressure) that can be detected in the pressing area 165p may be 10 mN to several tens of N.

Referring to FIGS. 1A to 1C and 2A to 2D, an imaginary straight line that extends in a direction (for example, horizontally and/or vertically) in which the sensor 165 is positioned from the center of each of the symbols 295a to 295e, 295a' to 295f', or 295a" to 295f" of the control menu 295 may pass through one among the sensing area 165s of each of sensors 165a to 165c of FIG. 2A or 165a to 165f of FIG. 2B and the pressing area 165p of each of sensors 165a' to 165c' of FIG. 2C or 165a' to 165f' of FIG. 2D.

Referring to FIGS. 1A to 1C and 2A to 2D, the sensing area 165s of each of the sensors 165a to 165c of FIG. 2A or 165a to 165f of FIG. 2B and the pressing area 165p of each of the sensors 165a' to 165c' of FIG. 2C or 165a' to 165f' of FIG. 2D may be positioned to be spaced apart from each other (for example, the sensing area 165s and/or the pressing area 165p of each of the sensors are not overlapped) in such a manner as to correspond to each of the symbols 295a to 295e, 295a' to 295f', or 295a" to 295f" spaced apart from one another in the control menu 295.

One or a plurality of sensors may be provided according to the control menu 295. For example, when there is one symbol of the control menu 295, there is the one sensor 165. When there are a plurality of symbols of the control menu 295, there is the plurality of sensors 165a to 165c, 165a to 165f, 165a' to 165c', or 165a' to 165f'.

The sensor 165 may be positioned below one among the bezels 180a (for example, FIGS. 2A and 2C) or a plurality of the bezels 180a (for example, 2B and 2D).

The sensor 165 may detect a force (or pressure) corresponding to the user input received by the display panel 170. The sensor 165 may output an electric signal corresponding to the force (or pressure) to a controller 210 (shown in FIG. 7). In addition, the sensor 165 may output the electric signal corresponding to the force (or pressure) to a separate controller (the controller for converting the received electric signal and outputting the converted signal to the controller 210). The electric signal corresponding to the force (or pressure) may be changed according to the strength of the received force.

The display panel 170 may include one or a plurality of substrates in which a thin transistor film (TFT) is formed, and an LCD. In addition, the display panel 170 may include substrates and active matrix organic light emitting diodes (AMOLED).

The display panel 170 may include a polarizing plate and/or a color filter that is brought into contact with the substrate.

On one side of the display panel 170, a printed circuit board that generates a driving signal for driving the display panel 170 may be positioned.

The display panel 170 and the printed circuit board may be electrically connected to each other through a chip-on-film. The chip-on-film may electrically connect the display panel 170 and the printed circuit board that are supported inside the bottom chassis 110.

In a gravity acting direction (for example, in a direction of −z-axis), the display panel 170, the chip-on-film, and the printed circuit board may be connected one another. Below the display panel 170, the middle frame 160 may be positioned.

The top chassis 180 is coupled to the bottom chassis 110 that has accommodated the components 120 to 170 of the display apparatus 100. The top chassis 180 may be disposed in front of the display apparatus 100 to prevent the impact applied from the outside to the components 120 to 170 accommodated in the bottom chassis 110 and/or the outflow (for example, optical loss) of the light irradiated from the internal light sources 120.

The top chassis 180 may be formed along a periphery of the display panel 170. The top chassis 180 may have a shape (for example, "⌐" or "⊏") of a cross-section that can cover top and side edges of the display panel 170. The top chassis 180 includes an opening 181. The entire surfaces of the four corners except the opening 181 of the top chassis 180 may be referred to as a "bezel."

Content displayed in the display panel 170 may be provided through the opening 181. In addition, the control menu 295 may be displayed in the display panel 170 through the opening 181. Through the opening 181, a part (for example, 2 mm or less from the corner present in the direction of the opening of one among the bezels 180a) of an active area 170a (shown in FIG. 3B) and a black mask area 170b (shown in FIG. 3B) of the display panel 170 may be displayed. Through the opening 181, a partial area (for example, 7 mm or less from the corner present in the direction of the opening of one among the bezels 180a) of the black mask area may be displayed. In addition, through the opening 181, the black mask area may not be exposed.

As the width of one among the bezels 180a becomes smaller in the top chassis 180, the display apparatus 100 may decrease in its weight and size. As the width of one among the bezels 180a becomes smaller, immersive feeling for the content displayed in the display apparatus 100 may increase. In addition, as the width of one among the bezels 180a becomes smaller in the top chassis 180, the display apparatus 100 may provide, to a user, a larger screen that is increased by the width of one among the bezels 180a reduced compared to the size of the same display panel.

In FIGS. 3A to 6B, the film type sensor will be described as one example. Exemplary embodiments can be implemented as other sensors having the chip type sensor as well as the above-described film type sensor.

Figure 3A:
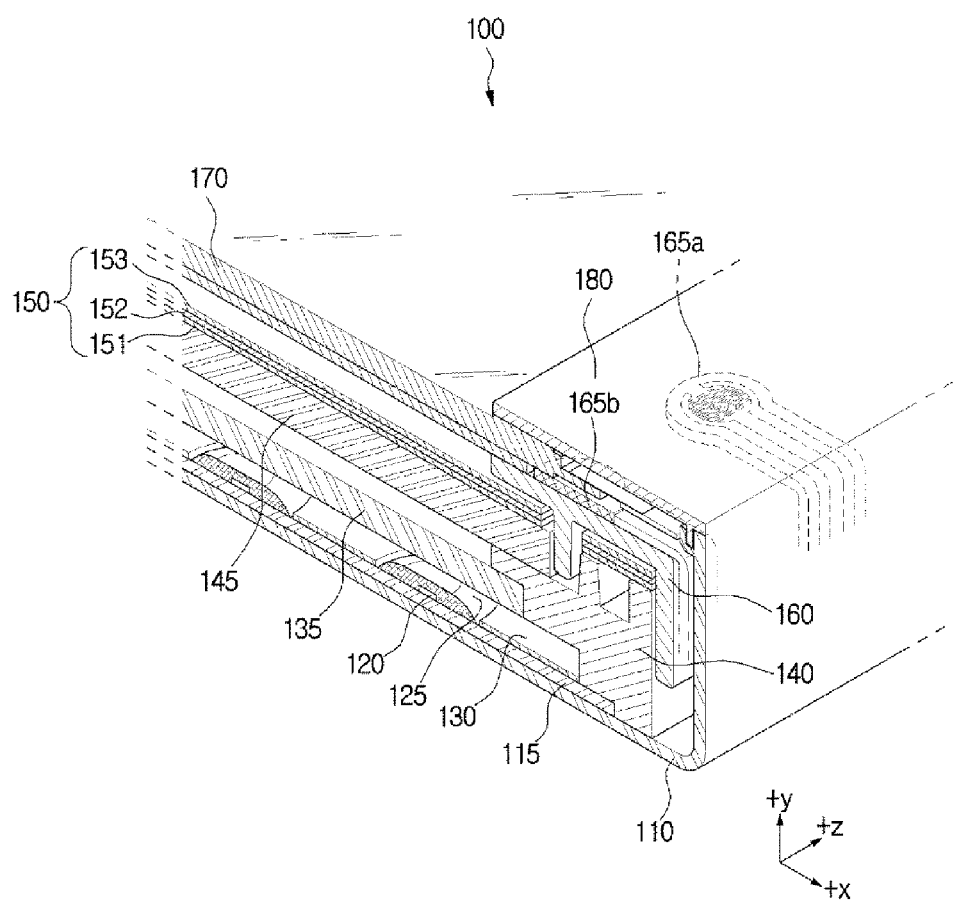
FIGS. 3A and 3B are schematic cross-sectional views showing a display apparatus according to an exemplary embodiment.
Figure 3B:
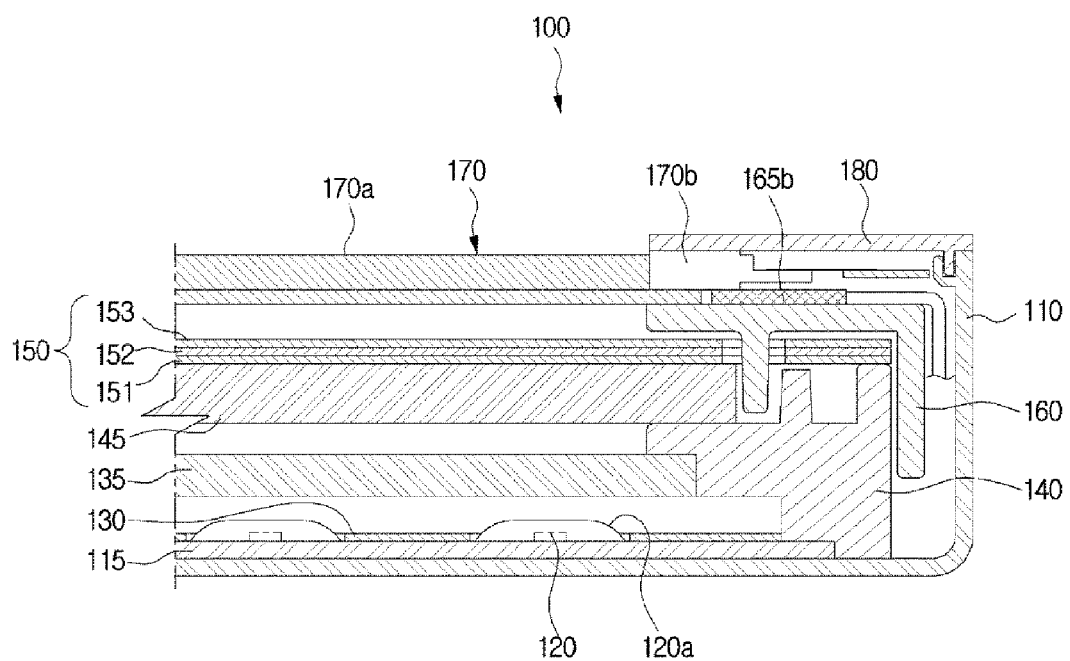

FIGS. 3A and 3B are schematic cross-sectional views showing a display apparatus according to an exemplary embodiment.

Referring to FIGS. 3A and 3B, the display apparatus 100 includes light source printed circuit board 115, the light sources 120 each having a lens 120a, the reflecting sheet 130, the light guide plate 135, the middle holder 140, the diffusion plate 145, the optical sheet 150, the sensor 165, the display panel 170, and the top chassis 180 in the direction of +y-axis with respect to the bottom chassis 110.

At least one among the above-described components 110 to 180 can be changed or omitted according to the function and/or operation of the display apparatus 100.

The sensor 165 (e.g., the sensor 165b) is positioned below the top chassis 180. The front surface of the sensor 165 may be positioned below the display panel 170 positioned below the top chassis 180. The sensing area 165s positioned on the front surface of the sensor 165 may be brought into contact with the black mask area 170b of the display panel 170. In addition, the sensing area 165s positioned on the front surface of the sensor 165 may be brought into contact with the active area 170a and the black mask area 170b of the display panel 170.

The sensor 165 may be positioned above the middle frame 160. The rear surface of the sensor 165 may be positioned above the middle frame 160. The rear surface of the sensor 165 may be brought into contact with the middle frame 160.

The width of the sensing area 165s of the sensor 165 may be smaller than the width of one among the bezels 180a. The width of the sensing area 165s of the sensor 165 may be smaller than the width of the middle frame 160. In addition, the width of the sensing area 165s of the sensor 165 may be smaller than the width of the middle holder 140.

The thickness of the sensor 165 may be smaller than the thickness of the display panel 170. The thickness of the sensor 165 may be smaller than the thickness of the bottom chassis 110. The thickness of the sensor 165 may be smaller than the thickness of the middle frame 160. In addition, the thickness of the sensor 165 may be smaller than the thickness of the top chassis 180.

When a user touches one among symbols (e.g., 295a to 295e) of the control menu 295 of FIG. 1A displayed in the display panel 170, the sensor 165 may detect a voltage (for example, mV range) corresponding to the user's touch. For example, the plurality of sensors 165a to 165c of FIG. 2A may detect a different voltage corresponding to each of the user's touches. The plurality of sensors 165a to 165c may detect a different voltage according to a distance between each of the user's touches and the plurality of sensors 165a to 165c.

According to another exemplary embodiment, the plurality of sensors 165a to 165f of FIG. 2B may detect a different voltage corresponding to each of the user's touches. The plurality of sensors 165a to 165f may detect a different voltage according to a distance between each of the user's touches and the plurality of sensors 165a to 165f.

According to another exemplary embodiment, the plurality of sensors 165a' to 165c' of FIG. 2C may detect a different voltage corresponding to each of the user's touches. The plurality of sensors 165a' to 165c' may detect a different voltage according to a distance between each of the user's touches and the plurality of sensors 165a' to 165c'.

According to another exemplary embodiment, the plurality of sensors 165a' to 165f' of FIG. 2D may detect a different voltage corresponding to each of the user's touches. The plurality of sensors 165a' to 165f' may detect a different voltage according to a distance between each of the user's touches and the plurality of sensors 165a' to 165f'.

When a user touches one among symbols (e.g., 295a to 295e) of the control menu 295 of FIG. 1A displayed in the display panel 170, the sensor 165 may detect one among a current (for example, mA range), a capacitance (for example, pF range), and a resistance (for example, mΩ range) that correspond to the touch. For example, the plurality of sensors 165a to 165c of FIG. 2A may detect one among a different current, a different capacitance, and a different resistance that correspond to each of the user's touches. The plurality of sensors 165a to 165c of FIG. 2A may detect one among a different current, a different capacitance, and a different resistance according to a distance between each of the user's touches and the plurality of sensors 165a to 165c.

According to another exemplary embodiment (for example, FIGS. 2B, 2C, and/or 2D), the detection of one among the current, the capacitance, and the resistance through the sensor 165 may be substantially similar to (for example, a difference in exemplary embodiments) the detection of one among the current, the capacitance, and the resistance through the sensor 165 according to an exemplary embodiment of FIG. 2A, and thus repeated description thereof will be omitted.

In FIGS. 3A and 3B, the display apparatus can be implemented by the control menu 295' of FIG. 1B and the control menu 295" of FIG. 1C as well as the control menu 295 of FIG. 1A displayed in the display panel 170.

Figure 4A:
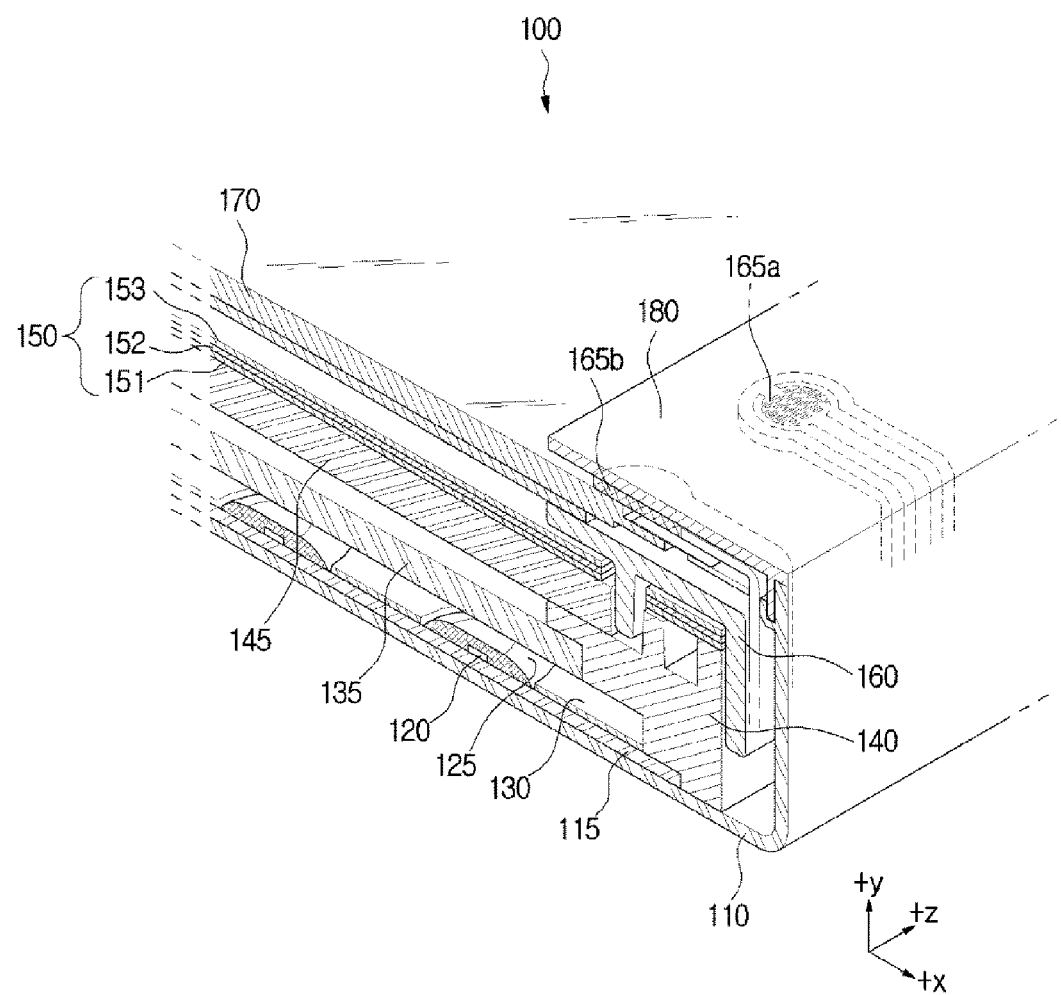
FIGS. 4A and 4B are schematic cross-sectional views showing a display apparatus according to another exemplary embodiment.
Figure 4B:
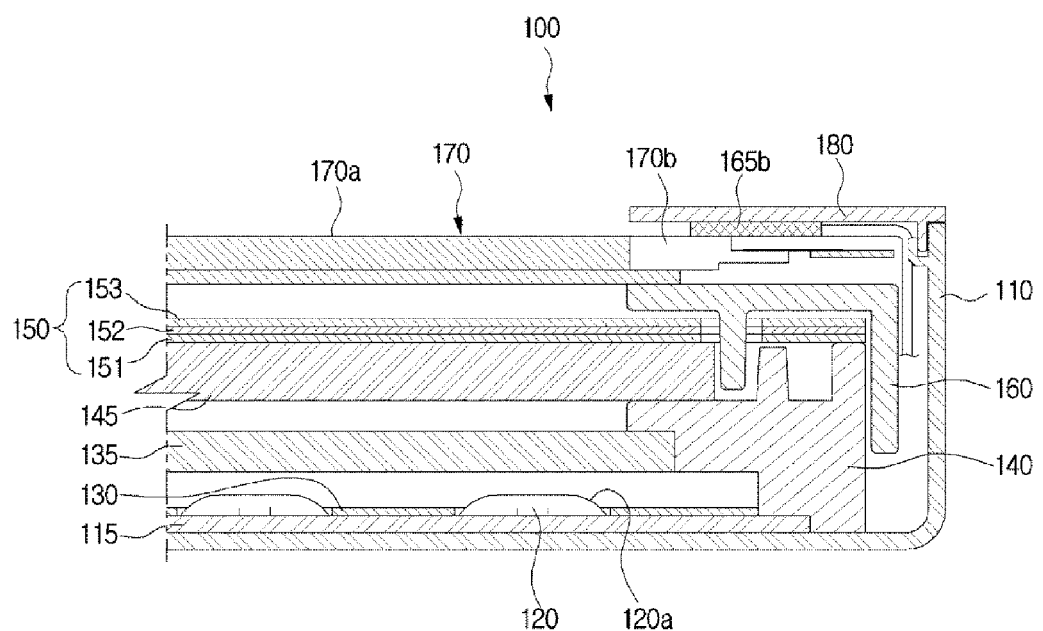

FIGS. 4A and 4B are schematic cross-sectional views showing a display apparatus according to another exemplary embodiment.

Referring to FIGS. 4A and 4B, the display apparatus 100 includes the light source printed circuit board 115, the light sources 120 each having the lens 120a, the reflecting sheet 130, the light guide plate 135, the middle holder 140, the diffusion plate 145, the optical sheet 150, the display panel 170, the sensor 165, and the top chassis 180 in the direction of +y-axis with respect to the bottom chassis 110.

At least one among the above-described components 110 to 180 can be changed or omitted according to the function and/or operation of the display apparatus 100.

The sensor 165 (e.g., the sensor 165b) is positioned below the top chassis 180. The front surface of the sensor 165 may be positioned below the top chassis 180. The sensing area 165s positioned on the front surface of the sensor 165 may be brought into contact with the rear surface of the top chassis 180.

The sensor 165 may be positioned above the display panel 170. The rear surface of the sensor 165 may be positioned above the black mask area 170b of the display panel 170. The rear surface of the sensor 165 may be brought into contact with the black mask area 170b of the display panel 170.

The width of the sensing area 165s of the sensor 165 may be smaller than the width of one among the bezels 180a. The width of the sensing area 165s of the sensor 165 may be smaller than the width of the middle frame 160. In addition, the width of the sensing area 165s of the sensor 165 may be smaller than the width of the middle holder 140.

The thickness of the sensor 165 may be smaller than the thickness of the display panel 170. The thickness of the sensor 165 may be smaller than the thickness of the bottom chassis 110. The thickness of the sensor 165 may be smaller than the thickness of the middle frame 160. In addition, the thickness of the sensor 165 may be smaller than the thickness of the top chassis 180.

When a user touches one among symbols (e.g., 295a to 295e) of the control menu 295 of FIG. 1A displayed in the display panel 170, the sensor 165 may detect a voltage (for example, mV range) corresponding to the user's touch. For example, the plurality of sensors 165a to 165c of FIG. 2A may detect a different voltage corresponding to each of the user's touches. The plurality of sensors 165a to 165c may detect a different voltage according to a distance between each of the user's touches and the plurality of sensors 165a to 165c.

According to another exemplary embodiment, the plurality of sensors 165a to 165f of FIG. 2B may detect a different voltage corresponding to each of the user's touches. The plurality of sensors 165a to 165f may detect a different voltage according to a distance between each of the user's touches and the plurality of sensors 165a to 165f.

According to another exemplary embodiment, the plurality of sensors 165a' to 165c' of FIG. 2C may detect a different voltage corresponding to each of the user's touches. The plurality of sensors 165a' to 165c' may detect a different voltage according to a distance between each of the user's touches and the plurality of sensors 165a' to 165c'.

According to another exemplary embodiment, the plurality of sensors 165a' to 165f' of FIG. 2D may detect a different voltage corresponding to each of the user's touches. The plurality of sensors 165a' to 165f' may detect a different voltage according to a distance between each of the user's touches and the plurality of sensors 165a' to 165f'.

The voltage detected by the sensor 165 in FIGS. 4A and 4B may be lower than the voltage detected by the sensor 165 in FIGS. 3A and 3B.

When a user touches one among symbols (e.g., 295a to 295e) of the control menu 295 of FIG. 1A displayed in the display panel 170, the sensor 165 may detect one among a current (for example, mA range), a capacitance (for example, pF range), and a resistance (for example, mΩ range) that correspond to the touch. For example, the plurality of sensors 165a to 165c of FIG. 2A may detect one among a different current, a different capacitance, and a different resistance that correspond to each of the user's touches. The plurality of sensors 165a to 165c of FIG. 2A may detect one among a different current, a different capacitance, and a different resistance according to a distance between each of the user's touches and the plurality of sensors 165a to 165c.

According to another exemplary embodiment (for example, FIGS. 2B, 2C, and/or 2D), the detection of one among the current, the capacitance, and the resistance through the sensor 165 may be substantially similar to (for example, a difference in exemplary embodiments) the detection of one among the current, the capacitance, and the resistance through the sensor 165 according to an exemplary embodiment of FIG. 2A, and thus repeated description thereof will be omitted.

In FIGS. 4A and 4B, the display apparatus can be implemented by the control menu 295' of FIG. 1B or the control menu 295" of FIG. 1C as well as the control menu 295 of FIG. 1A displayed in the display panel 170.

Figure 5A:
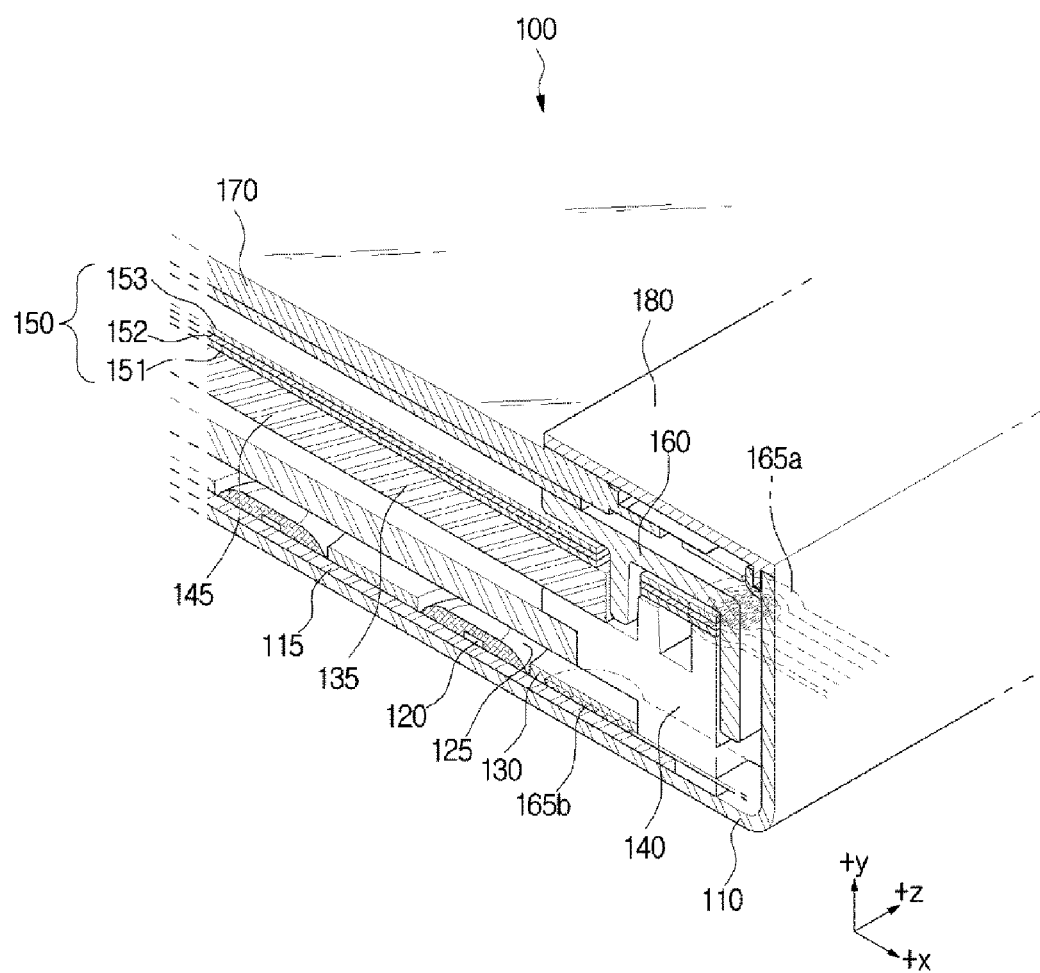
FIGS. 5A and 5B are schematic cross-sectional views showing a display apparatus according to another exemplary embodiment.
Figure 5B:
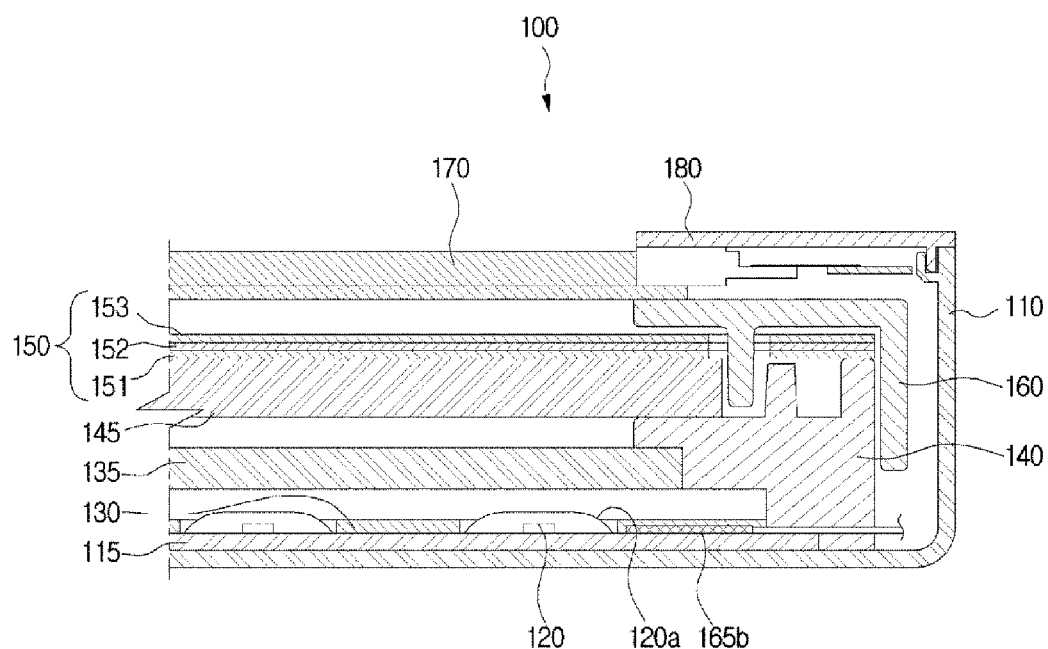

FIGS. 5A and 5B are schematic cross-sectional views showing a display apparatus according to another exemplary embodiment.

Referring to FIGS. 5A and 5B, the display apparatus 100 includes the light source printed circuit board 115, the light sources 120 each having the lens 120a, the sensor 165, the reflecting sheet 130, the light guide plate 135, the middle holder 140, the diffusion plate 145, the optical sheet 150, the display panel 170, and the top chassis 180 in the direction of +y-axis with respect to the bottom chassis 110.

At least one among the above-described components 110 to 180 can be changed or omitted according to the function and/or operation of the display apparatus 100.

The sensor 165 (e.g., the sensor 165b) may be positioned below the reflecting sheet 130. The front surface of the sensor 165 may be positioned below the reflecting sheet 130. The sensing area 165s positioned on the front surface of the sensor 165 may be brought into contact with the rear surface of the reflecting sheet 130.

The sensor 165 may be positioned above the light source printed circuit board 115. The rear surface of the sensor 165 may be positioned above the light source printed circuit board 115. The rear surface of the sensor 165 may be brought into contact with the surface of the light source printed circuit board 115.

The width of the sensing area 165s of the sensor 165 may be smaller than the width of one among the bezels 180a. The width of the sensing area 165s of the sensor 165 may be smaller than the width of the middle frame 160. In addition, the width of the sensing area 165s of the sensor 165 may be smaller than the width of the middle holder 140.

The thickness of the sensor 165 may be smaller than the thickness of the display panel 170. The thickness of the sensor 165 may be smaller than the thickness of the bottom chassis 110. The thickness of the sensor 165 may be smaller than the thickness of the middle frame 160. In addition, the thickness of the sensor 165 may be smaller than the thickness of the top chassis 180.

When a user touches one among symbols (e.g., 295a to 295e) of the control menu 295 of FIG. 1A displayed in the display panel 170, the sensor 165 may detect a voltage (for example, mV range) corresponding to the user's touch. For example, the plurality of sensors 165a to 165c of FIG. 2A may detect a different voltage corresponding to each of the user's touches. The plurality of sensors 165a to 165c may detect a different voltage according to a distance between each of the user's touches and the plurality of sensors 165a to 165c.

According to another exemplary embodiment, the plurality of sensors 165a to 165f of FIG. 2B may detect a different voltage corresponding to each of the user's touches. The plurality of sensors 165a to 165f may detect a different voltage according to a distance between each of the user's touches and the plurality of sensors 165a to 165f.

According to another exemplary embodiment, the plurality of sensors 165a' to 165c' of FIG. 2C may detect a different voltage corresponding to each of the user's touches. The plurality of sensors 165a' to 165c' may detect a different voltage according to a distance between each of the user's touches and the plurality of sensors 165a' to 165c'.

According to another exemplary embodiment, the plurality of sensors 165a' to 165f' of FIG. 2D may detect a different voltage corresponding to each of the user's touches. The plurality of sensors 165a' to 165f' may detect a different voltage according to a distance between each of the user's touches and the plurality of sensors 165a' to 165f'.

The voltage detected by the sensor 165 in FIGS. 5A and 5B may be lower than the voltage detected by the sensor 165 in FIGS. 3A and 3B.

When a user touches one among symbols (e.g., 295a to 295e) of the control menu 295 of FIG. 1A displayed in the display panel 170, the sensor 165 may detect one among a current (for example, mA range), a capacitance (for example, pF range), and a resistance (for example, mΩ range) that correspond to the touch. For example, the plurality of sensors 165a to 165c of FIG. 2A may detect one among a different current, a different capacitance, and a different resistance that correspond to each of the user's touches. The plurality of sensors 165a to 165c of FIG. 2A may detect one among a different current, a different capacitance, and a different resistance according to a distance between each of the user's touches and the plurality of sensors 165a to 165c.

According to another exemplary embodiment (for example, FIGS. 2B, 2C, and/or 2D), the detection of one among the current, the capacitance, and the resistance through the sensor 165 may be substantially similar to (for example, a difference in exemplary embodiments) the detection of one among the current, the capacitance, and the resistance through the sensor 165 according to an exemplary embodiment of FIG. 2A, and thus repeated description thereof will be omitted.

In FIGS. 5A and 5B, the display apparatus can be implemented by the control menu 295' of FIG. 1B or the control menu 295" of FIG. 1C as well as the control menu 295 of FIG. 1A displayed in the display panel 170.

Figure 6A:
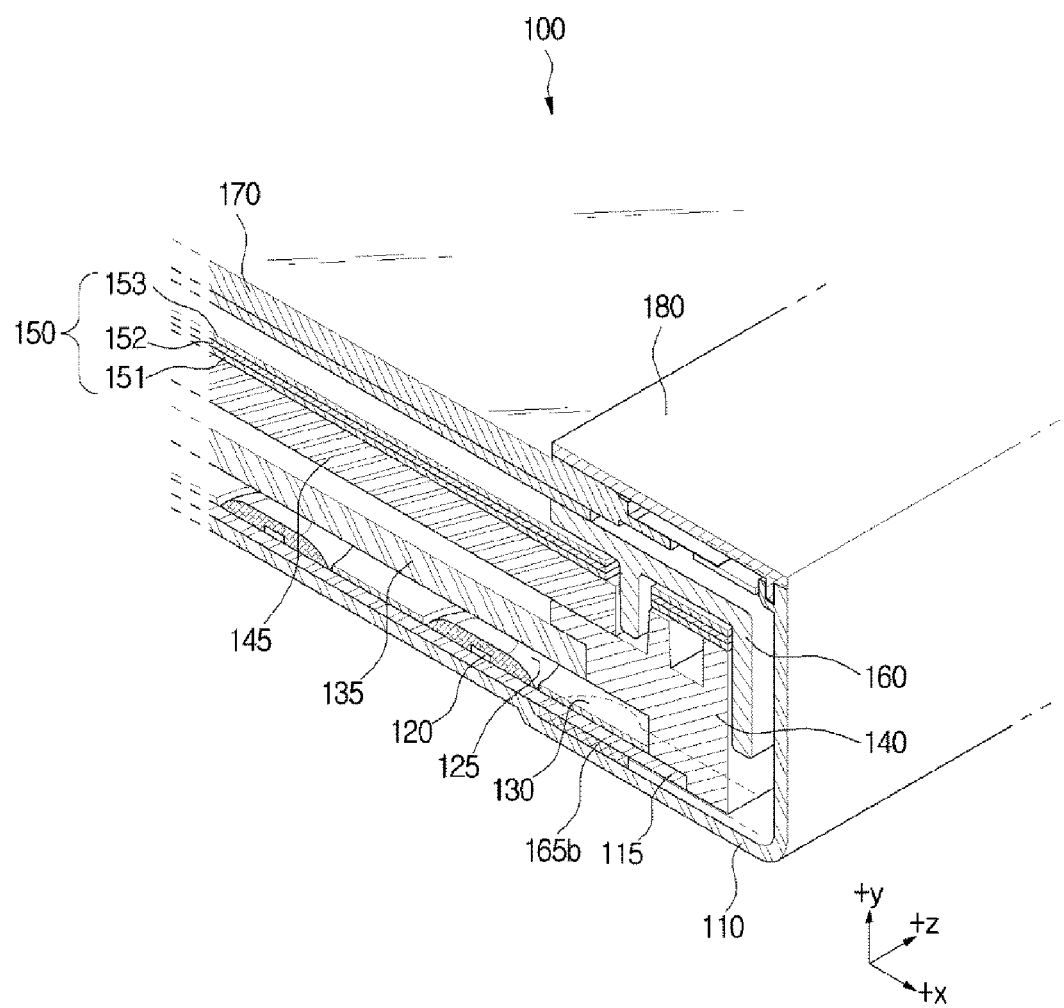
FIGS. 6A and 6B are schematic cross-sectional views showing a display apparatus according to another exemplary embodiment.
Figure 6B:
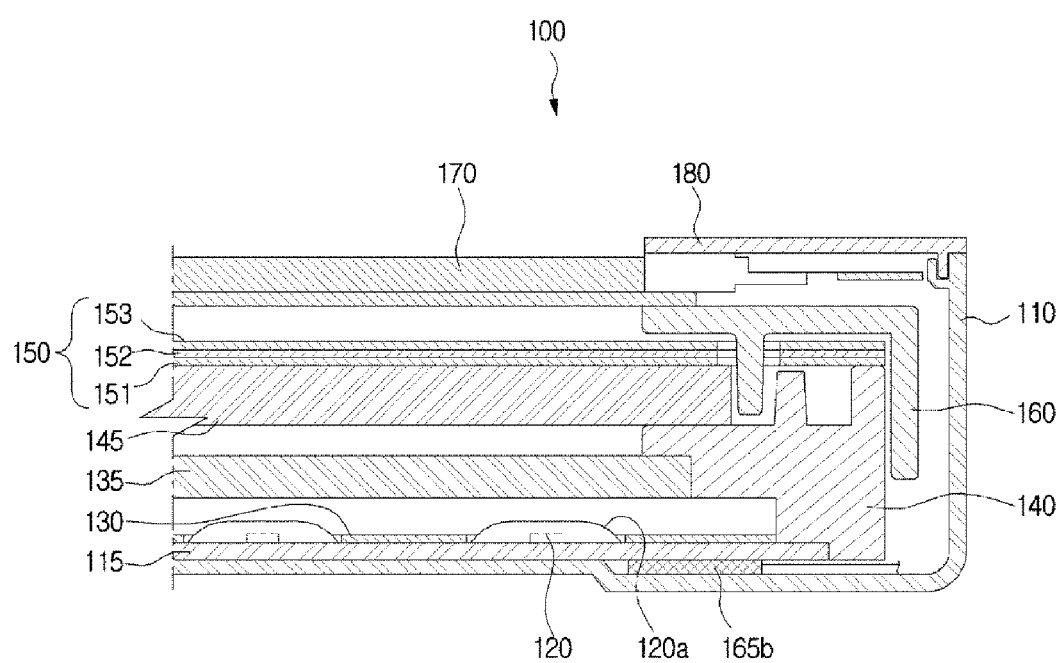

FIGS. 6A and 6B are schematic cross-sectional views showing a display apparatus according to another exemplary embodiment.

Referring to FIGS. 6A and 6B, the display apparatus 100 includes the sensor 165, the light source printed circuit board 115, the light sources 120 each having the lens 120a, the reflecting sheet 130, the light guide plate 135, the middle holder 140, the diffusion plate 145, the optical sheet 150, the display panel 170, and the top chassis 180 in the direction of +y-axis with respect to the bottom chassis 110.

At least one among the above-described components 110 to 180 can be changed or omitted according to the function and/or operation of the display apparatus 100.

The sensor 165 (e.g., the sensor 165b) may be positioned below the light source printed circuit board 115. The front surface of the sensor 165 may be positioned below the light source printed circuit board 115. The sensing area 165s positioned on the front surface of the sensor 165 may be brought into contact with the rear surface of the light source printed circuit board 115.

The sensor 165 may be positioned above the bottom chassis 110. The rear surface of the sensor 165 may be positioned above the bottom chassis 110. The rear surface of the sensor 165 may be brought into contact with the surface of the bottom chassis 110.

The width of the sensing area 165s of the sensor 165 may be smaller than the width of one among the bezels 180a. The width of the sensing area 165s of the sensor 165 may be smaller than the width of the middle frame 160. In addition, the width of the sensing area 165s of the sensor 165 may be smaller than the width of the middle holder 140.

The thickness of the sensor 165 may be smaller than the thickness of the display panel 170. The thickness of the sensor 165 may be smaller than the thickness of the bottom chassis 110. The thickness of the sensor 165 may be smaller than the thickness of the middle frame 160. In addition, the thickness of the sensor 165 may be smaller than the thickness of the top chassis 180.

When a user touches one among symbols (e.g., 295a to 295e) of the control menu 295 of FIG. 1A displayed in the display panel 170, the sensor 165 may detect a voltage (for example, mV range) corresponding to the user's touch. For example, the plurality of sensors 165a to 165c of FIG. 2A may detect a different voltage corresponding to each of the user's touches. The plurality of sensors 165a to 165c may detect a different voltage according to a distance between each of the user's touches and the plurality of sensors 165a to 165c.

According to another exemplary embodiment, the plurality of sensors 165a to 165f of FIG. 2B may detect a different voltage corresponding to each of the user's touches. The plurality of sensors 165a to 165f may detect a different voltage according to a distance between each of the user's touches and the plurality of sensors 165a to 165f.

According to another exemplary embodiment, the plurality of sensors 165a' to 165c' of FIG. 2C may detect a different voltage corresponding to each of the user's touches. The plurality of sensors 165a' to 165c' may detect a different voltage according to a distance between each of the user's touches and the plurality of sensors 165a' to 165c'.

According to another exemplary embodiment, the plurality of sensors 165a' to 165f' of FIG. 2D may detect a different voltage corresponding to each of the user's touches. The plurality of sensors 165a' to 165f' may detect a different voltage according to a distance between each of the user's touches and the plurality of sensors 165a' to 165f'.

The voltage detected by the sensor 165 in FIGS. 6A and 6B may be lower than the voltage detected by the sensor 165 in FIGS. 3A and 3B.

When a user touches one among symbols (e.g., 295a to 295e) of the control menu 295 of FIG. 1A displayed in the display panel 170, the sensor 165 may detect one among a current (for example, mA range), a capacitance (for example, pF range), and a resistance (for example, mΩ range) that correspond to the touch. For example, the plurality of sensors 165*a* to 165*c* of FIG. 2A may detect one among a different current, a different capacitance, and a different resistance that correspond to each of the user's touches. The plurality of sensors 165*a* to 165*c* of FIG. 2A may detect one among a different current, a different capacitance, and a different resistance according to a distance between each of the user's touches and the plurality of sensors 165*a* to 165*c*.

According to another exemplary embodiment (for example, FIGS. 2B, 2C, and/or 2D), the detection of one among the current, the capacitance, and the resistance through the sensor 165 may be substantially similar to (for example, a difference in exemplary embodiments) the detection of one among the current, the capacitance, and the resistance through the sensor 165 according to an exemplary embodiment of FIG. 2A, and thus repeated description thereof will be omitted.

In FIGS. 6A and 6B, the display apparatus can be implemented by the control menu 295' of FIG. 1B or the control menu 295" of FIG. 1C as well as the control menu 295 of FIG. 1A displayed in the display panel 170.

Figure 7:
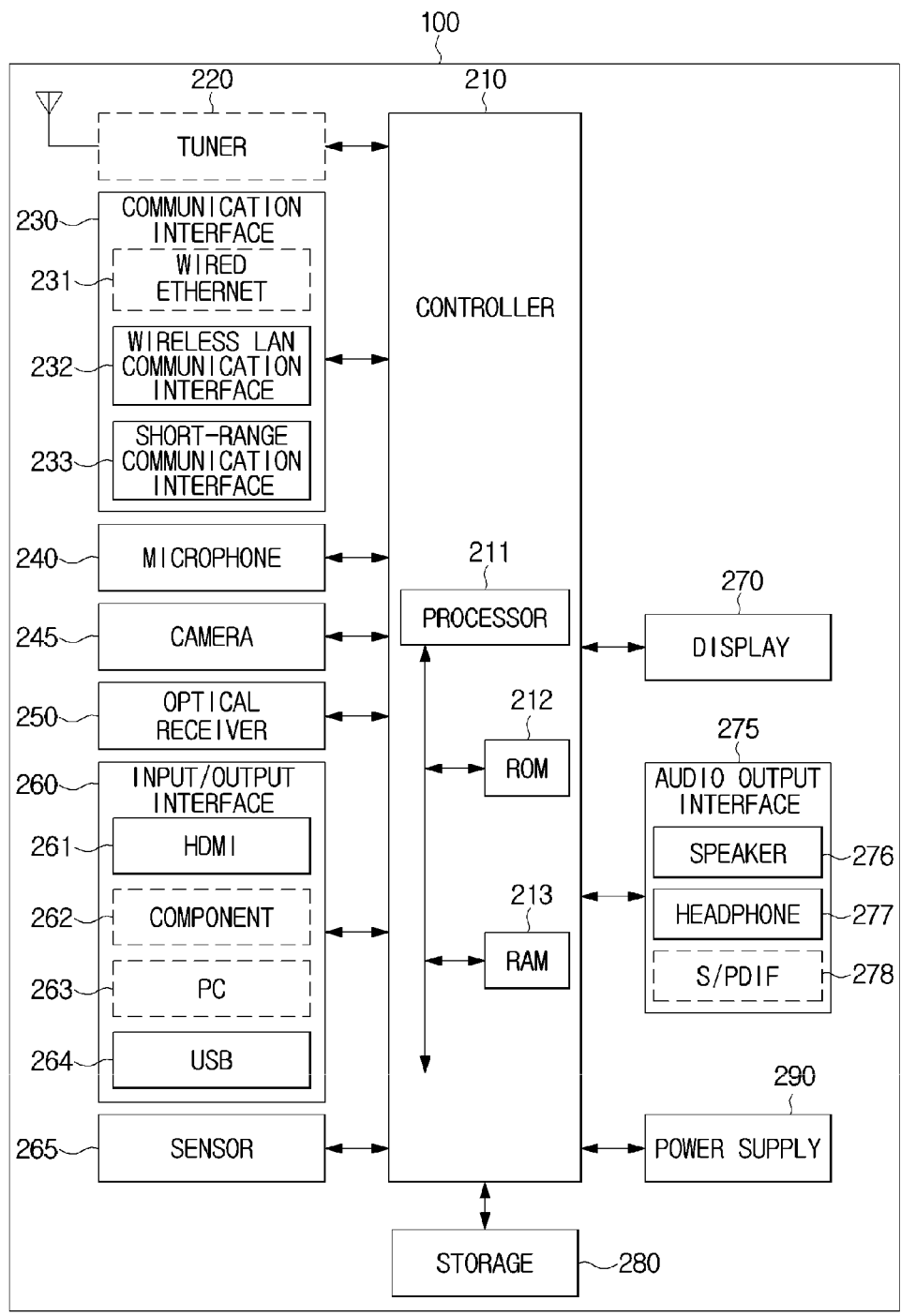
FIG. 7 is a schematic block diagram showing a display apparatus according to an exemplary embodiment.

FIG. 7 is a schematic block diagram showing a display apparatus according to an exemplary embodiment.

Referring to FIG. 7, the display apparatus 100 may be connected to an external electronic apparatus in a wired or wireless manner, using a communication interface 230 or an input/output interface 260.

The display apparatus 100 includes a tuner 220, the communication interface 230, a microphone 240, a camera 245, an optical receiver 250, the input/output interface 260, a sensor 265, a display 270, an audio output interface 275, a storage 280, and a power supply 290.

A controller 210 includes a processor 211, a read-only memory (ROM) (or a non-volatile memory 212) in which a control program for controlling the display apparatus 100 is stored, and a random access memory (RAM) (or a volatile memory 213) that stores a signal or data input from outside of the display apparatus 100 or is used as a storage area regarding various operations performed by the display apparatus 100.

The controller 210 performs a function to control overall operations of the display apparatus 100 and a signal flow between the internal components 220 to 290 of the display apparatus 100, and process data. The controller 210 controls power supplied to the internal components 220 to 290 from the power supply 290. The processor 211 may include a graphic processing unit (GPU) for processing of graphics corresponding to images or videos. The processor 211 may be implemented by a system on chip (SoC) including a core and the GPU. In addition, the processor 211 may be implemented by an SoC including at least one among the ROM 212 and the RAM 213. The processor 211 may include a single core, a dual core, a triple core, a quad core, and a multiple core thereof.

The processor 211 may include a plurality of processors. The plurality of processors may include a main processor and a sub processor that is operated in a standby mode (for example, power-off of the display apparatus in which a power plug is connected to a power outlet).

The plurality of processors may include a sensor processor for controlling the main processor, the sub processor, and a sensor. In addition, the plurality of processors may include the main processor and the sensor processor.

The processor 211, the ROM 212, and the RAM 213 may be connected one another through an internal bus.

The controller 210 controls a user input detector for detecting a first user input and a display, controls a control menu to be displayed in the display in response to the detected first user input, and controls one among functions and operations of the display apparatus to be changed in response to a second user input detected in the control menu.

The controller 210 may control the first user input to be detected through one among the camera and the sensor.

The controller 210 may control the second user input to be detected through the sensor.

The controller 210 may control the power supply so that power may be continuously supplied to the user input detector, unlike in the display whose power has been turned off.

The controller 210 may include the main processor and the sub processor, and the user input detector may be controlled by the sub processor.

The term of "the controller of the display apparatus 100" in the exemplary embodiments includes the processor 211, the ROM 212, and the RAM 213 of the display apparatus 100. In addition, the term of "the controller of the display apparatus 100" may include the main processor, the sub processor, the ROM 212, and the RAM 213 of the display apparatus 100.

The configuration and operation of the controller 210 can be implemented in various ways according to exemplary embodiments.

The tuner 220 may tune and select only a frequency of a channel that the display apparatus 100 desires to receive among a number of radio components through amplification, mixing, resonance, or the like of a broadcasting signal received in a wired or wireless manner. The broadcasting signal includes video, audio, and additional data (for example, electronic program guide (EPG)).

The tuner 220 may receive video, audio, and data in a frequency band corresponding to a channel number (for example, cable broadcast channel number 506) corresponding to a user input. The tuner 220 may receive broadcast signals from various sources such as terrestrial broadcasting, cable broadcasting, satellite broadcasting, Internet broadcasting, and the like.

The communication interface 230 may connect the display apparatus 100 with a remote control device or an electronic device by the control of the controller 210.

The communication interface 230 may include one among a wired Ethernet 231, a wireless local area network (LAN) communication interface 232, and a short-range communication interface 233 in response to the performance and structure of the display apparatus 100. In addition, the communication interface 230 may include a combination of the Ethernet 231, the wireless LAN communication interface 232, and the short-range communication interface 233.

The microphone 240 receives a user's uttered voice. The microphone 240 may convert the received voice into an electrical signal and output the converted signal to the controller 210. The user's voice may include, for example, a voice corresponding to the control of the menu or function of the display apparatus 100. The recognition range of the microphone 240 may be changed to correspond to the magnitude of the user's voice and an ambient environment (for example, speaker sound or ambient noise).

The camera 245 takes a video (for example, consecutive frames) corresponding to a user's motion in the recognition range of the camera. The user's motion may include user's presence (for example, a user appears within the camera recognition range), a user's body part such as a face, expressions, hands, fist, fingers, and the like of the user, motions of the user's body part, and the like. The recognition range of the camera 245 may be a distance of 0.2 to 5 m from the camera 245 to the user.

The camera 245 may be constituted of a lens and an image sensor. The camera 245 may support optical zoom or digital zoom using a plurality of lenses and image processing.

The camera 245 may be positioned in one among an upper end, a lower end, a left side, and a right side of the display apparatus 100. In addition, the camera 245 may be positioned in one among a center region of the upper end, a right region of the lower end, a center region of the lower end, and a left region of the lower end.

The camera 245 may convert the video taken by the control of the controller 210 into an electrical signal and output the converted signal to the controller 210. The controller 210 may analyze the taken video to recognize the user's motion. The controller 210 may display menus in the display apparatus 100 using the motion recognition result, or perform control corresponding to the motion recognition result (for example, channel control, volume control, etc.).

The optical receiver 250 receives an optical signal (including control information) output from a remote control device through a light window.

The optical receiver 250 may receive the optical signal corresponding to the user input (for example, touch, push, touch gesture, voice, or motion) from the remote control device. The control information may be extracted from the received optical signal. The received optical signal and/or the extracted control information may be transmitted to the controller 210.

The input/output interface 260 receives content from the outside of the display apparatus 100 by the control of the controller 210. The content may include, for example, videos, images, texts, or web documents. In addition, the content may include videos including advertisement, images including advertisement, and web documents including advertisement.

The input/output interface 260 may include one among an high-definition multimedia interface (HDMI) input port 261, a component input jack 262, a PC input port 263, and a universal serial bus (USB) input jack 264 that correspond to the reception of the content. The input/output interface 260 may include a combination of the HDMI input port 261, the component input jack 262, the PC input port 263, and the USB input jack 264.

The input/output interface 260 can be added, removed, and/or changed according to the performance and structure of the display apparatus 100.

The display 270 displays a video included in a broadcast signal received through the tuner 220 by the control of the controller 210. The display 270 may display content (for example, video) input through the communication interface 230 or the input/output interface 260. The display 270 may output the content stored in the storage 280 by the control of the controller 210. In addition, the display 270 may display a voice user interface (UI) for performing a voice recognition task corresponding to voice recognition or a motion UI for performing a motion recognition task corresponding to motion recognition. For example, the voice UI may include a voice instruction guide, and the motion UI may include a motion instruction guide.

The screen of the display apparatus 100 in accordance with the exemplary embodiments may be used as a meaning including the display 270 of the display apparatus 100.

The audio output interface 275 outputs an audio included in the broadcast signal received through the tuner 220 by the control of the controller 210. The audio output interface 275 may output an audio (for example, corresponding to voice or sound) input through the communication interface 230 or the input/output interface 260. In addition, the audio output interface 275 may output an audio file stored in the storage 280 by the control of the controller 210.

The audio output interface 275 may include one among a speaker 276, a headphone output terminal 277, and an S/PDIF output terminal 278.

The storage 280 may store a variety of data, programs, or applications for driving and controlling the display apparatus 100 by the control of the controller 210. The storage 280 may store input/output signals or data corresponding to the driving of the tuner 220, the communication interface 230, the microphone 240, the camera 245, the optical receiver 250, the input/output interface 260, the display 270, the audio output interface 275, and the power supply 290.

The storage 280 may store control programs for controlling the display apparatus 100 and the controller 210, applications initially provided from a manufacturer or downloaded from the outside, application related-graphical user interfaces (GUIs, hereinafter, referred to as "GUI"), objects (for example, image texts, icons, buttons, etc.) for providing the GUI, user information, documents, databases, or related data.

The storage 280 may include a broadcast reception module, a channel control module, a volume control module, a communication control module, a voice recognition module, a motion recognition module, an optical reception module, a display control module, an audio control module, an external input control module, a power control module, a voice database (DB), and a motion DB. The modules and DBs of the storage may be implemented in the form of software to perform a control function of broadcast reception, a channel control function, a volume control function, a communication control function, a voice recognition function, a motion recognition function, an optical reception control function, a display control function, an audio control function, an external input control function, or a power control function in the display apparatus 100. The controller 210 may perform the function of the display apparatus 100 using the software stored in the storage 280.

The storage 280 may store display apparatus information.

The storage 280 store user input detection position information.

The storage 280 may store moving pictures, images, or texts corresponding to visual feedback.

The storage 280 may store sound corresponding to acoustic feedback.

The storage 280 may store a feedback providing time (for example, 300 ms) of the feedback provided to a user.

The term of the "storage" in the exemplary embodiments may be used as the term including the storage 280, a storage implemented by the ROM 212, the RAM 213, and the SoC of the controller 210, a memory card (for example, micro SD card or USB memory) mounted in the display apparatus 100, and an external storage (for example, USB memory) that is connectable to the USB input jack 264 of the input/output interface 260. In addition, the storage may include a non-volatile memory, a volatile memory, a hard disk drive (HDD), or a solid state drive (SSD).

The power supply 290 supplies power input from an external power source, to the internal components 210 to 290 of the display apparatus 100 by the control of the controller 210. The power supply 290 may supply power input from one or two batteries or more positioned inside the display apparatus 100 by the control of the controller 210, to the internal components 210 to 290.

The power supply 290 may include a first power supply that supplies power to the camera 245 of the display apparatus 100 whose power has been turned off (or screen-off of the display apparatus 100 in which a power plug is connected to a power outlet). The power supply 290 may include a first power supply that supplies power to the camera 245 of the display apparatus 100 whose power has been turned off (however, the power plug is connected to the power outlet), and a sub processor for controlling the camera 245. In addition, the power supply 290 may include a first power supply that supplies power to the camera 245 of the display apparatus 100 whose power has been turned off (however, the power plug is connected to the power outlet), and a sensor processor for controlling the camera 245.

At least one (for example, at least one among boxes indicated by dotted lines) among the components 210 to 290 shown in the display apparatus 100 of FIG. 7 may be added, changed, or removed according to the performance and/or kind of the display apparatus 100. In addition, the positions of the components 210 to 290 can be changed to correspond to the performance or structure of the display apparatus 100.

The display apparatus 100 of FIG. 2 may be the same apparatus as the display apparatus 100 of FIG. 7. For example, the screen, the display panel 170, and the display 270 may have the same meaning. The detailed description of the internal components 110 to 190 and 210 to 290 in the drawings have been separately shown in different drawings and have been described.

Hereinafter, a case of controlling the screen of the display apparatus 100 will be described in detail.

FIG. 8 is a schematic flowchart showing an input method of a display apparatus according to an exemplary embodiment.

FIGS. 9A, 9B, 9C, and 9D are schematic views showing an example of an input method of a display apparatus according to an exemplary embodiment.

In operation S810 of FIG. 8, the screen of the display apparatus is turned off.

Figure 9A:
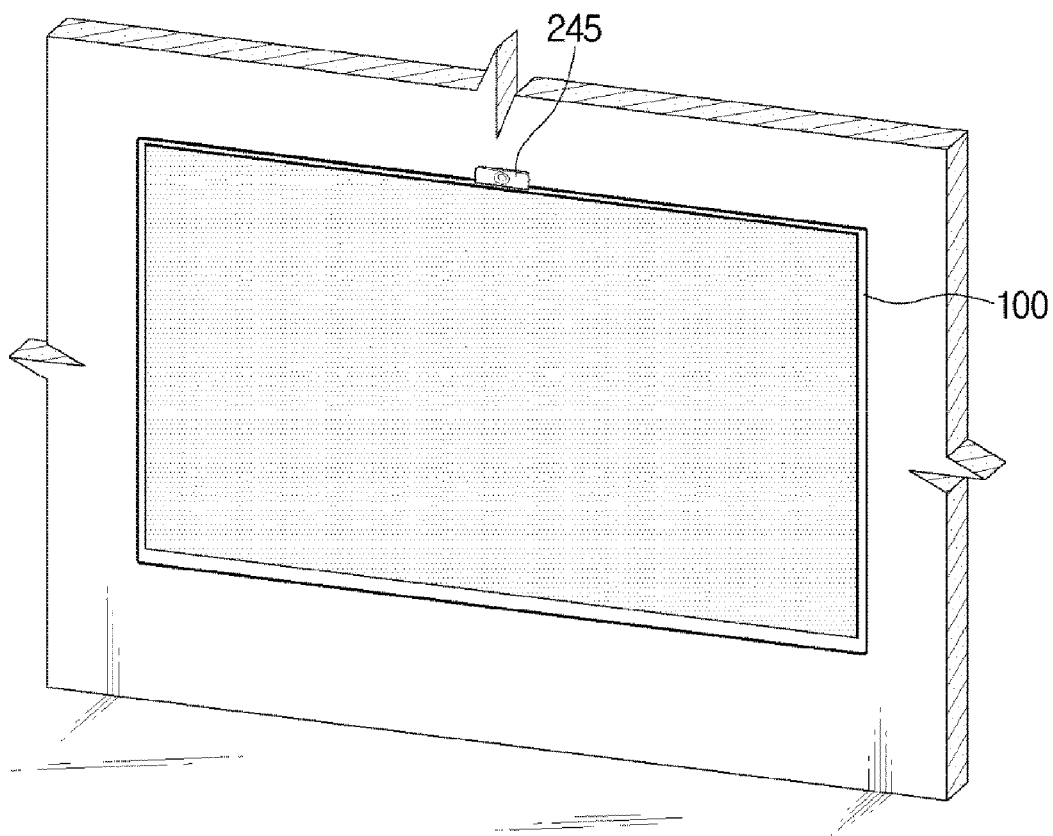
FIGS. 9A, 9B, 9C, and 9D are schematic views showing an example of an input method of a display apparatus according to an exemplary embodiment.

Referring to FIG. 9A, the screen of the display apparatus 100 is turned off. For example, the screen of the display apparatus 100 may be turned off by a user input. In addition, the screen of the display apparatus 100 may be turned off by a remote control device.

When the screen of the display apparatus 100 is turned off (when the power of the display apparatus 100 is turned off), the display apparatus 100 is connected to an external power outlet through a power plug. When the screen of the display apparatus 100 is turned off, power may be supplied to a sub processor. In addition, when the screen of the display apparatus 100 is turned off, power may be supplied to the camera 245.

When the screen of the display apparatus 100 is turned off, power may be continuously supplied to the camera 245 to detect a user's motion.

When the screen of the display apparatus 100 is turned off, power may be continuously supplied to the camera 245 of the display apparatus 100 whose screen has been turned off, by a first power supply. In addition, when the screen of the display apparatus 100 is turned off, power may be continuously supplied to the camera 245 of the display apparatus 100 whose screen has been turned off, and to the sub processor that controls the camera 245, by the first power supply.

When the screen of the display apparatus 100 is turned off, power may be continuously supplied to a sensor 165 of the display apparatus 100 whose screen has been turned off, by the first power supply. In addition, when the screen of the display apparatus 100 is turned off, power may be continuously supplied to the sensor 165 of the display apparatus 100 whose screen has been turned off, and to the sub processor that controls the sensor 165, by the first power supply.

Referring to FIG. 9A, a user's motion is not detected in a recognition range of the camera 245 of the display apparatus 100 whose screen has been turned off. In addition, a user input is not detected through the sensor 165 of the display apparatus 100 whose screen has been turned off.

In operation S820 of FIG. 8, the display apparatus detects a first user input in the display apparatus.

Figure 9B:
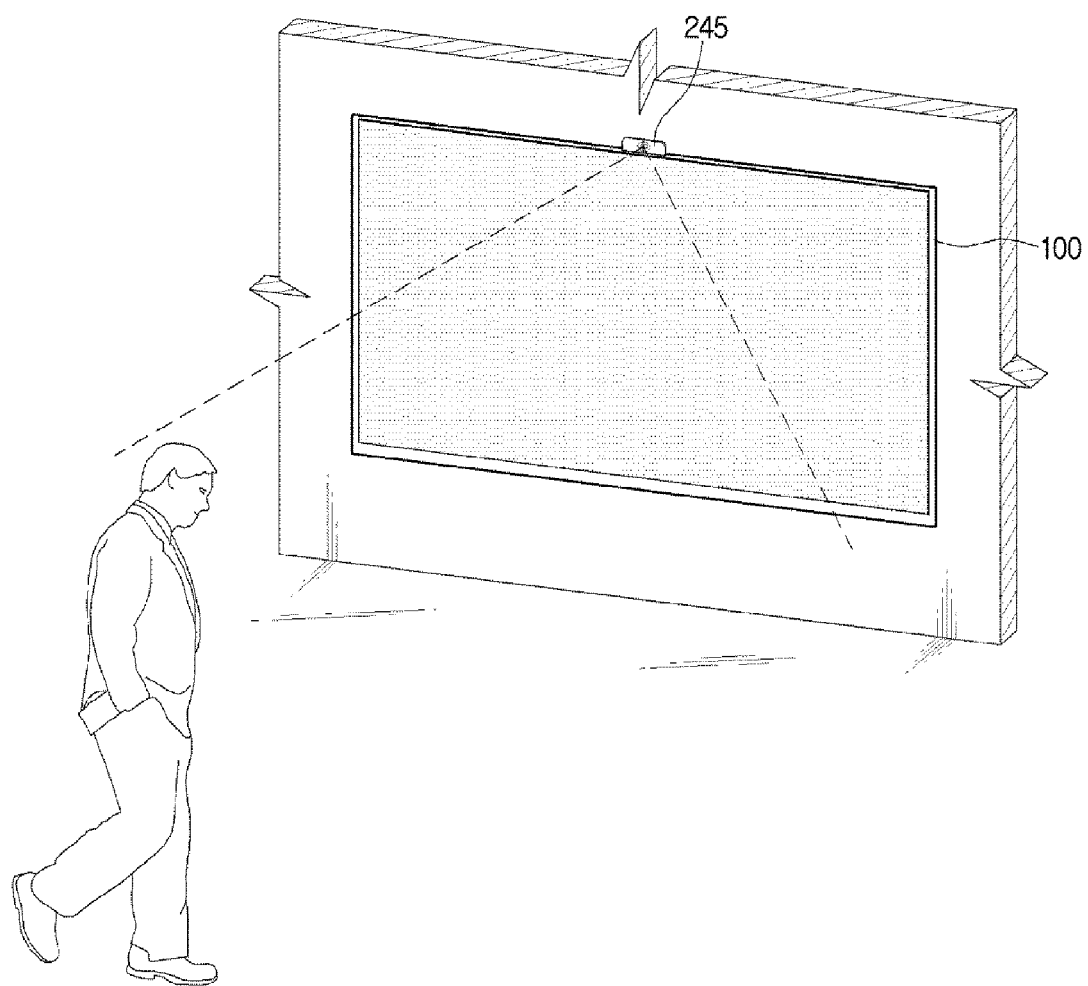

Referring to FIG. 9B, a user may enter the recognition range of the camera 245 of the display apparatus 100. The camera 245 may photograph the first user input, for example, the user's presence (the user appears within the recognition range of the camera), the user's body part such as a face, expressions, hands, fist, fingers, and the like of the user, a motion of the user's body part, and the like in units of frames (for example, 1, 2, 5, 10, 15, 30, and 60 frames per second that can be changed). The camera 245 may transmit an output (for example, an electrical signal or data out) corresponding to the first user input to the sub processor.

The camera 245 may photograph a previous frame (for example, when the first user input is not received) and a current frame (for example, when the first user input is received). The sub processor for controlling the camera 245 may analyze each of the photographed frames. The sub processor may analyze the previous frame and the current frame. The sub processor may detect the first user input through the analysis.

The display apparatus 100 may include a separate dedicated processor for controlling the camera 245. When controlling the camera 245, the dedicated processor may analyze the previous frame and the current frame to detect the first user input. When the dedicated processor controls the camera 245, the sub processor may control other components (for example, a sensor or a first power supply) except the camera 245.

A case in which the camera 245 is used in the detection of the first user input has been described, but an radio frequency (RF) sensor using the Doppler effect, a pyroelectric infrared (PIR) sensor using infrared rays, a capacitive proximity sensor, and/or a microphone 240 in addition to the camera 245 can be used.

The user may apply the first user input to the screen of the display apparatus 100. The sensor 165 may detect the first user input (for example, a tap, a double tap, a triple tap, a touch gesture, a set pattern input, or the like). The sensor 165 may transmit an output (data out) corresponding to the first user input to the sub processor.

The sub processor for controlling the sensor 165 may analyze the received output (data out). The sub processor may detect the first user input through the analysis.

In the exemplary embodiments, the camera 245 and the sensor 165 may be referred to as a user input detector. The user input detector may include both the camera 245 and the sensor 165 or include only the sensor 165. For example, when the user input detector includes the camera 245 and the sensor 165, the camera 245 may detect the first user input, and the sensor 165 may detect a second user input. In addition, when the user input detector includes the camera 245 and the sensor 165, the camera 245 may not detect the first user input, and the sensor 165 may detect the first user input and the second user input.

When the user input detector includes only the sensor 165, the sensor 165 may detect the first user input and the second user input.

In operation S830 of FIG. 8, the display apparatus displays a control menu on the screen of the display apparatus.

Figure 9C:
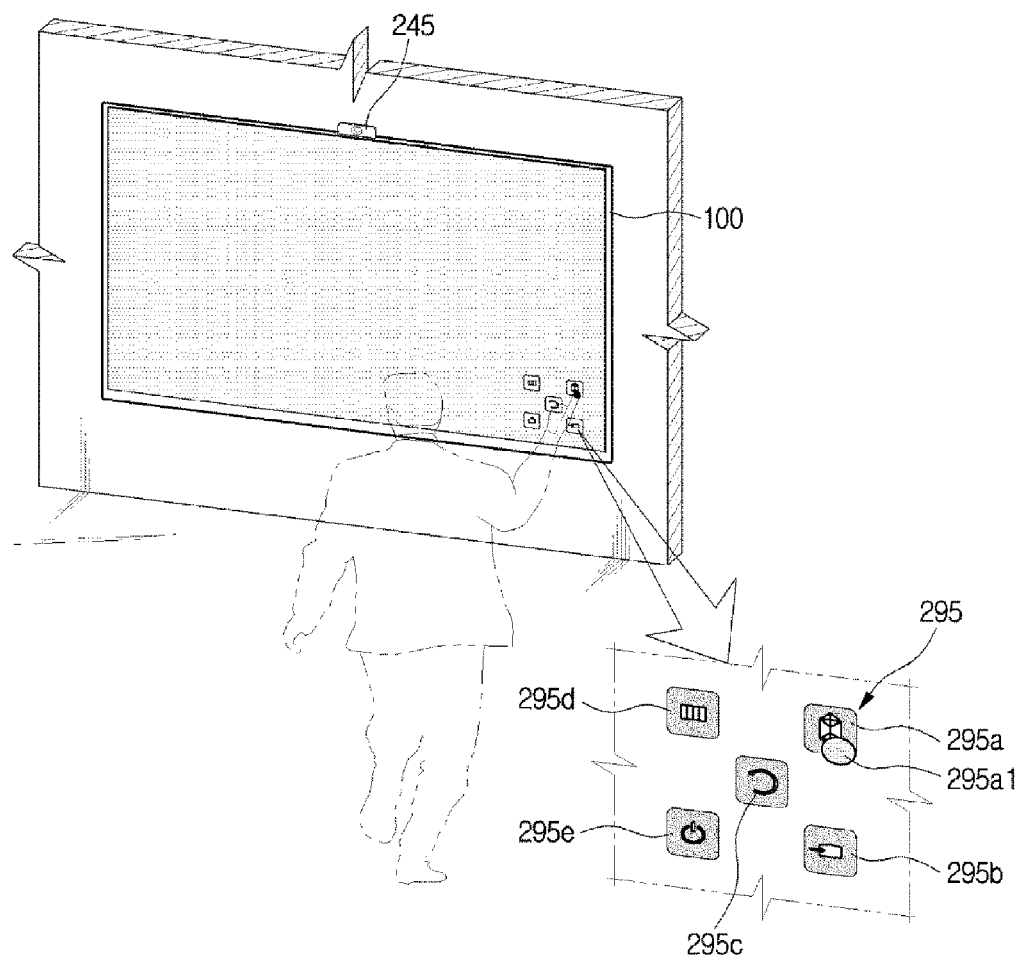

Referring to FIG. 9C, the controller 210 may display a control menu 295 corresponding to the detection of the first user input on the screen of the display apparatus 100. The controller 210 may display the control menu 295 corresponding to the detection of the first user input on one side (for example, closer to a bezel rather than the center of the screen of the display apparatus) of the screen of the display apparatus 100.

The array of the control menu 295 may include an "X"-shaped array, a "+"-shaped array, a "−"-shaped array, a "□"-shaped array, a "◇"-shaped array, a "○"-shaped array, or a "|"-shaped array. To correspond to the array of the control menu 295, the sensor 165 may be positioned between the bottom chassis 110 and the top chassis 180.

The number of symbols displayed in the control menu 295 may be one to ten to correspond to the function and/or control of the display apparatus. The above-described five symbols are an example, and are not limited thereto.

In operation S840 of FIG. 8, the display apparatus detects the second user input in the control menu.

Referring to FIG. 9C, a user applies the second user input (for example, a touch or a tap) to the smart hub 295a of the control menu 295. The sensor 165 may detect a force (or pressure) corresponding to the second user input. The controller 210 may detect the second user input using the sensor 165. The controller 210 may calculate a second user input position 295a1 (for example, coordinates of X1 and Y1) corresponding to the second user input using an electrical signal received from the sensor 165.

When the user applies the second user input to the smart hub 295a of the control menu 295, each of the plurality of sensors may detect a force (or pressure). For example, the plurality of sensors may be the sensors 165a to 165c of FIG. 2A, 165a to 165f of FIG. 2B, 165a' to 165c' of FIG. 2C, or 165a' to 165f' of FIG. 2D.

The controller 210 may calculate the second user input position 295a1 (for example, coordinates of X1 and Y1) corresponding to the second user input using the electrical signal received from each of the above-described plurality of sensors.

The storage 280 may store the electrical signal received from the sensor 165 by the control of the controller 210. The storage 280 may store a touch detection position detected by the control of the controller 210. In addition, the storage 280 may store the electrical signal received from the sensor 165 and/or the touch detection position calculated by the control of the controller 210 as "user input detection position information." The stored user input detection position information may include a touch detection position identifier (ID) for history management, a sensor ID, an electrical signal reception time received from each sensor, an electrical signal value of each sensor, the calculated touch detection position, and the like.

The following [Table 1] may show an example of the user input detection position information stored in the storage 280 by the control of the controller 210.

TABLE 1

Unit: [mV]

| Sensor 1 | Sensor 2 | Sensor 3 | User input detection position |
|---|---|---|---|
| 10 | 5 | 3 | 295a |
| 3 | 5 | 10 | 295b |
| 3 | 4 | 3 | 295c |
| 2 | 1 | 0.5 | 295d |
| 0.5 | 1 | 2 | 295e |
| 0 | 0 | 0 | No touch |

Here, the second user input position may include a sensor 1 (for example, 165a), a sensor 2 (for example, 165b), a sensor 3 (for example, 165c) each for outputting an electrical signal, and a touch detection position The second user input position may include a variety of items but is not limited thereto.

When the number of sensors is increased, or when the type of the sensor is changed, the items of [Table 1] can be changed.

In operation S850 of FIG. 8, of the display apparatus changes one among the operation and function of the display apparatus based on the second user input.

Figure 9D:
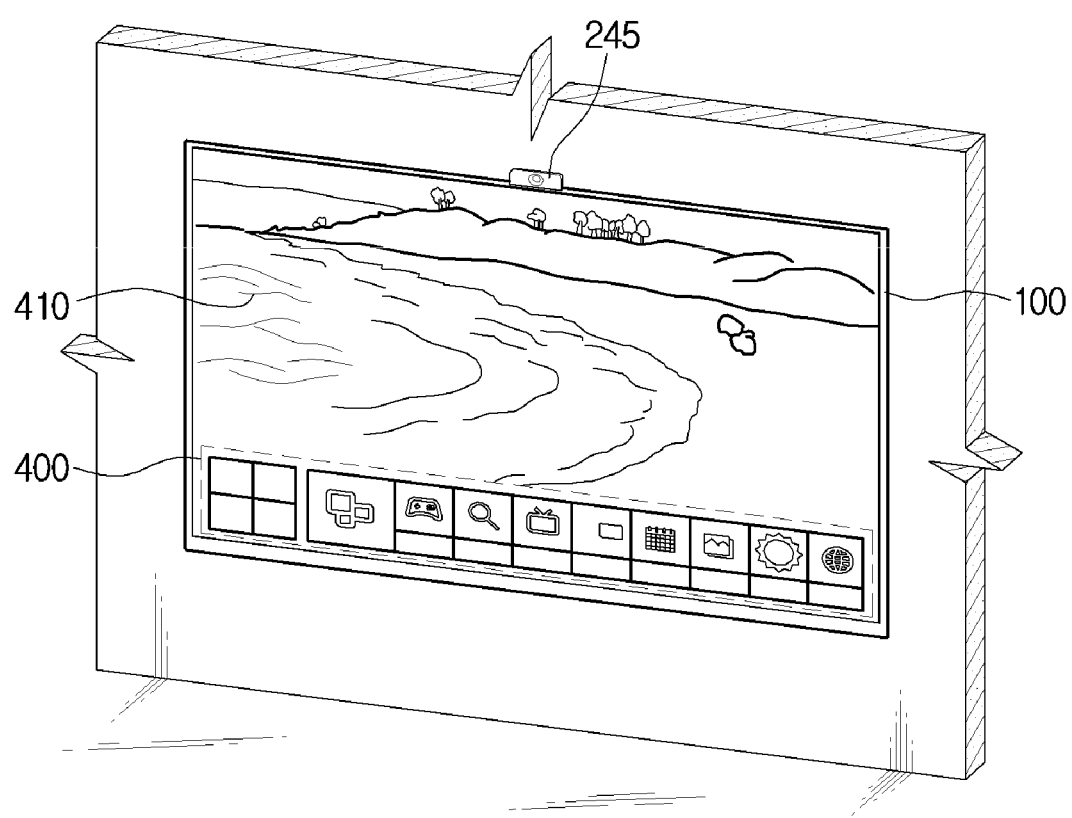

Referring to FIG. 9D, the controller 210 may display a smart hub 400 on the screen of the display apparatus 100 in response to the detection of the second user input. The controller 210 may display content 410 on the screen of the display apparatus 100 in response to the detection of the second user input. In addition, the controller 210 may display (for example, to be overlapped) the smart hub 400 together with the content 410 on the screen of the display apparatus 100 in response to the detection of the second user input.

According to another exemplary embodiment, when the content 410 is displayed in the display apparatus 100, the user may apply the first user input (for example, a tap, a double tap, a triple tap, a touch gesture, a set pattern input, or the like) to the screen. For example, when the first user input is the double tap, the controller 210 may display a control menu (volume up/down) corresponding to volume control. When the first user input is the triple tap, the controller 210 may display a control menu (channel up/down) corresponding to channel control.

The user may apply the second user input to a control menu corresponding to the first user input.

The controller 210 may change one among the operation (for example, channel change) and function (for example, display of the smart hub) of the display apparatus in response to the second user input.

The setting of the type of the first user input and the function/operation corresponding to the type of the first user input may be stored through the configuration of the display apparatus 100.

In operation S850 of FIG. 8, in response to the display apparatus changing one among the operation and function of the display apparatus based on the second user input, the input method of the display apparatus is terminated.

As described above, according to the exemplary embodiments, the display apparatus in which the control menu for controlling the operation or function of the display apparatus may be displayed on the screen using one among a force sensor and a pressure sensor, and the input method of the display apparatus, may be provided.

The display apparatus having a thin thickness in which the control menu for controlling the operation or function of the display apparatus may be displayed on the screen using one among the force sensor and the pressure sensor, and the input method of the display apparatus, may be provided.

The display apparatus in which the control menu for controlling the operation or function of the display apparatus may be displayed on the screen using one among the force sensor and the pressure sensor and thereby may facilitate a user's operation, and the input method of the display apparatus, may be provided.

The display apparatus in which the control menu for controlling the operation or function of the display apparatus may be displayed on the screen using one among the force sensor and the pressure sensor and thereby may receive a user input on the screen even without a touch panel included in a touch screen, and the input method of the display apparatus, may be provided.

The display apparatus in which the control menu for controlling the operation or function of the display apparatus may be displayed on the screen using one among the force sensor and the pressure sensor, and the input method of the display apparatus, may be provided.

In addition, the exemplary embodiments may also be implemented through computer-readable code and/or instructions on a medium, e.g., a computer-readable medium, to control at least one processing element to implement any above-described embodiments. The medium may correspond to any medium or media that may serve as a storage and/or perform transmission of the computer-readable code.

The computer-readable code may be recorded and/or transferred on a medium in a variety of ways, and examples of the medium include recording media, such as magnetic storage media (e.g., ROM, floppy disks, hard disks, etc.) and optical recording media (e.g., compact disc read only memories (CD-ROMs) or digital versatile discs (DVDs)), and transmission media such as Internet transmission media. Thus, the medium may have a structure suitable for storing or carrying a signal or information, such as a device carrying a bitstream according to one or more exemplary embodiments. The medium may also be on a distributed network, so that the computer-readable code is stored and/or transferred on the medium and executed in a distributed fashion. Furthermore, the processing element may include a processor or a computer processor, and the processing element may be distributed and/or included in a single device.

The foregoing exemplary embodiments are examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus comprising:
   a bottom chassis;
   a display panel disposed above the bottom chassis, the display panel comprising an active area configured to display a control menu, and a black mask area surrounding the active area;
   a light source disposed between the bottom chassis and the display panel, and configured to irradiate light;
   an optical member disposed between the light source and the display panel, and configured to cause the light irradiated from the light source to be incident on the display panel;
   a middle frame disposed between the optical member and the display panel, and configured to support the display panel; and
   a sensor disposed between the middle frame and the display panel, and configured to sense a user input received by the control menu.

2. The display apparatus according to claim 1, wherein the sensor is further configured to sense a force or a pressure of the user input.

3. The display apparatus according to claim 1, wherein the sensor comprises one of a sensing area and a pressing area configured to sense a force or a pressure of the user input.

4. The display apparatus according to claim 3, wherein the one of the sensing area and the pressing area is disposed below the black mask area.

5. The display apparatus according to claim 3, wherein the one of the sensing area and the pressing area contacts the black mask area.

6. The display apparatus according to claim 3, further comprising a top chassis that is coupled to the bottom chassis, the top chassis comprising a bezel,
   wherein the one of the sensing area and the pressing area is disposed below the bezel.

7. The display apparatus according to claim 3, wherein the one of the sensing area and the pressing area is disposed in the black mask area, and
   a straight line extends in a direction of the one of the sensing area and the pressing area from a center of a symbol of the control menu and passes through the one of the sensing area and the pressing area.

8. The display apparatus according to claim 3, wherein the sensor comprises a plurality of sensors disposed in the black mask area to be spaced apart from each other.

9. The display apparatus according to claim 1, wherein the sensor comprises a plurality of sensors disposed in proximity to each other and disposed in only a single corner of the display.

10. The display apparatus according to claim 9, wherein the plurality of sensors in the single corner, together define a position where touch occurs on the display screen.

11. A display apparatus comprising:
    a bottom chassis;
    a light source configured to irradiate light;
    a display panel configured to display content through the irradiated light, the display panel comprising an active area configured to display a control menu, and a black mask area surrounding the active area;
    an optical member configured to cause the irradiated light to be incident on the display panel;
    a sensor disposed on the display panel, and configured to sense a user input received by the control menu; and
    a top chassis coupled to the bottom chassis,
    wherein the sensor comprises one of a sensing area and a pressing area configured to detect a force or a pressure of the user input,
    the one of the sensing area and the pressing area is disposed on the black mask area, and
    a straight line extends from a center of a symbol of the control menu displayed by the active area to the one of the sensing area and the pressing area, and passes through the one of the sensing area and the pressing area.

12. The display apparatus according to claim 11, wherein the one of the sensing area and the pressing area contacts the black mask area.

13. The display apparatus according to claim 11, wherein the top chassis comprises a bezel, and
    the one of the sensing area and the pressing area is disposed below the bezel.

14. The display apparatus according to claim 11, wherein the sensor comprises a plurality of sensors disposed on the black mask area to be spaced apart from each other.

\* \* \* \* \*